US012810220B2

(12) United States Patent
Doherty et al.

(10) Patent No.: US 12,810,220 B2
(45) **Date of Patent: *Nov. 24, 2026**

(54) SYSTEM AND METHOD FOR PROVIDING MULTI-TIERED REPORTING IN A REALM OF A CLOUD ENVIRONMENT

(71) Applicant: Oracle International Corporation, Redwood Shores, CA (US)

(72) Inventors: Kristen Elizabeth Doherty, Carmel, CA (US); Matthew Rushton, Portsmouth, NH (US); Richard Stockton, Minneapolis, MN (US)

(73) Assignee: Oracle International Corporation, Redwood Shores, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 18/790,513

(22) Filed: Jul. 31, 2024

(65) Prior Publication Data

US 2024/0396897 A1 Nov. 28, 2024

Related U.S. Application Data

(63) Continuation of application No. 18/639,806, filed on Apr. 18, 2024.

(Continued)

(51) Int. Cl.

*G06Q 10/0631* (2023.01)
*G06Q 20/22* (2012.01)

(Continued)

(52) U.S. Cl.

CPC ................. *G06Q 10/06312* (2013.01); *G06Q 10/06313* (2013.01); *G06Q 20/22* (2013.01); *G06Q 30/0201* (2013.01); *H04L 63/102* (2013.01)

(58) Field of Classification Search

CPC ......... G06Q 10/6312; G06Q 10/06313; G06Q 20/22; G06Q 30/0201; H04L 63/102

See application file for complete search history.

(56) References Cited

U.S. PATENT DOCUMENTS

| | | | | |
|---|---|---|---|---|
| 8,898,763 | B1 * | 11/2014 | Mannepalli | H04L 63/10 726/6 |
| 9,092,502 | B1 | 7/2015 | Cannaliato et al. | |

(Continued)

FOREIGN PATENT DOCUMENTS

| | | | |
|---|---|---|---|
| CN | 105074695 | A | 11/2015 |
| CN | 110875844 | A | 3/2020 |

(Continued)

OTHER PUBLICATIONS

Anonymous: "Oracle Cloud Infrastructure Documentation—Security Guide for Exadata Database Service on Cloud@Customer Systems", Apr. 1, 2023, XP093181902.

(Continued)

*Primary Examiner* — Jason Chiang
(74) *Attorney, Agent, or Firm* — Invoke

(57) ABSTRACT

Systems and methods provide tiered assessment of use of services in a cloud environment. An operator cloud environment running on computers including microprocessors, wherein the operator cloud environment is deployed within a first realm owned by an operator tenant of the realm, a set of software products provided to the first realm from a cloud infrastructure provider of the cloud environment for access via the first realm by a plurality of end users as vendor cloud services, and a metering service. Usage data that records usage of services in a realm includes identification data associating user entities with their usage of the services is provided to the operator tenant associated with control of the realm. A second set of data is generated by processing the usage data to remove or convert the identification data and (Continued)

is provided to the cloud infrastructure provider associated with control of the cloud environment.

20 Claims, 15 Drawing Sheets

Related U.S. Application Data

(60) Provisional application No. 63/462,878, filed on Apr. 28, 2023.

(51) Int. Cl.
*G06Q 30/0201* (2023.01)
*H04L 9/40* (2022.01)

(56) References Cited

U.S. PATENT DOCUMENTS 9,306,814 B1 4/2016 Roth et al.
9,438,599 B1 9/2016 Yuhan et al.
9,722,895 B1 8/2017 Sarukkai et al.
9,766,912 B1 9/2017 Jorgensen
9,985,947 B1 5/2018 Elhard
10,496,306 B1* 12/2019 Srivastava ............ G06F 3/0631
10,757,574 B1 8/2020 Rule et al.
10,878,483 B1 12/2020 Felbinger et al.
10,965,737 B1 3/2021 Parulkar et al.
11,240,110 B1* 2/2022 Narula ................ H04L 41/5064
11,552,953 B1 1/2023 Avadhanam
11,720,536 B1 8/2023 Kisser et al.
12,412,103 B1* 9/2025 Chen ...................... G06N 5/022
12,650,847 B2 6/2026 Peterson et al.
2002/0198973 A1 12/2002 Besaw
2003/0154407 A1 8/2003 Kato et al.
2010/0212004 A1 8/2010 Fu
2012/0117462 A1* 5/2012 Jacobson .............. G06F 16/211 715/249
2013/0054426 A1 2/2013 Rowland et al.
2013/0276142 A1* 10/2013 Peddada ............... H04L 63/105 726/28
2013/0297711 A1 11/2013 Nhu
2013/0304925 A1 11/2013 Ferris et al.
2014/0280595 A1 9/2014 Mani et al.
2014/0280948 A1* 9/2014 Schmidt .............. H04L 63/0272 709/226
2015/0363852 A1 12/2015 Vautour
2016/0028833 A1* 1/2016 Georgieva ............ G06F 16/955 709/228
2016/0043909 A1* 2/2016 Pogrebinsky ........ G06Q 20/102 705/40
2016/0142211 A1 5/2016 Metke et al.
2016/0203533 A1* 7/2016 Cheng ................... H04L 63/083 705/26.1
2016/0203544 A1* 7/2016 Smits ................. G06Q 30/0623 705/26.81
2016/0277411 A1 9/2016 Dani et al.
2016/0323183 A1* 11/2016 Jeuk .................... H04L 41/5058
2016/0337365 A1* 11/2016 Beiter ................... H04L 63/101
2017/0230229 A1 8/2017 Sasturkar et al.
2018/0025403 A1* 1/2018 Mckay ............... G06Q 30/0619 705/26.44
2018/0052861 A1 2/2018 Seetharaman et al.
2018/0197161 A1* 7/2018 Kuzkin ................ G06Q 20/145
2018/0219784 A1 8/2018 Jiang et al.
2018/0232786 A1* 8/2018 Kuzkin .............. G06Q 20/0855
2018/0234256 A1 8/2018 Bowen
2019/0068495 A1* 2/2019 Jeuk ........................ H04L 41/50
2019/0087835 A1 3/2019 Schwed et al.
2019/0156000 A1 5/2019 Hoffmann et al.
2019/0166007 A1 5/2019 Sundaram et al.
2019/0205045 A1 7/2019 Hugot et al.
2019/0273796 A1* 9/2019 Allgeier .................. G06F 9/451
2019/0355363 A1 11/2019 Nelson et al.
2020/0014659 A1 1/2020 Chasman et al.
2020/0073692 A1 3/2020 Rao et al.
2020/0112497 A1 4/2020 Yenumulapalli et al.
2020/0117757 A1 4/2020 Yanamandra et al.
2020/0274900 A1* 8/2020 Vaishnavi ............... H04L 63/20
2020/0358756 A1 11/2020 Rose et al.
2021/0067468 A1* 3/2021 Cidon ................. H04L 63/0272
2021/0168052 A1 6/2021 Parulkar et al.
2021/0216190 A1 7/2021 Vakil et al.
2021/0234864 A1 7/2021 Dube et al.
2021/0273914 A1 9/2021 Cobb
2021/0279109 A1 9/2021 Ji et al.
2021/0377272 A1 12/2021 Dasari et al.
2021/0392142 A1 12/2021 Stephens et al.
2022/0091947 A1 3/2022 Kothari et al.
2022/0103618 A1 3/2022 Pinheiro et al.
2022/0116286 A1* 4/2022 Doshi ................. H04L 41/5025
2022/0150124 A1 5/2022 Cooley et al.
2022/0255902 A1 8/2022 Woodson
2022/0294818 A1 9/2022 Parekh et al.
2022/0300486 A1* 9/2022 Venkateshaiah .... G06F 16/2358
2022/0335340 A1 10/2022 Moustafa et al.
2022/0337578 A1* 10/2022 Mankekar ........... H04L 63/0815
2022/0374271 A1 11/2022 Pogrebinsky et al.
2023/0109926 A1 4/2023 Nair et al.
2023/0132478 A1 5/2023 Robinson et al.
2023/0195926 A1* 6/2023 Mehta ................. G06F 21/6245 726/1
2023/0229543 A1* 7/2023 Mohanty .................. G06N 3/08 714/48
2023/0244505 A1* 8/2023 Hernandez Serrano ..................... G06F 9/451 715/744
2023/0275833 A1* 8/2023 Hyun ...................... H04L 47/00 370/389
2023/0316348 A1 10/2023 Dageville et al.
2023/0328003 A1* 10/2023 Agarwal ............... H04L 47/762 709/226
2023/0342179 A1 10/2023 Suttle et al.
2023/0362161 A1 11/2023 Spector et al.
2023/0385286 A1 11/2023 Glickman et al.
2024/0054063 A1 2/2024 Wichelman et al.
2024/0095739 A1 3/2024 Adogla et al.
2024/0098089 A1* 3/2024 Adogla ................. G06F 9/5072
2024/0154992 A1* 5/2024 Martin .................... H04L 47/82
2024/0320240 A1 9/2024 Podder
2024/0364638 A1* 10/2024 Peterson ............. G06F 11/2028
2024/0364690 A1* 10/2024 Doherty .................. H04L 63/10
2024/0364707 A1* 10/2024 Elmenshawy ............ G06F 8/60
2024/0414518 A1* 12/2024 Joseph .................. H04W 8/183
2025/0085978 A1* 3/2025 R C ...................... G06F 9/4416
2025/0097215 A1* 3/2025 Vangpat .................. H04L 63/10
2025/0097223 A1* 3/2025 Brown ................ H04L 63/0876
2025/0322077 A1* 10/2025 Panwar ................... H04L 43/06
2025/0379830 A1* 12/2025 Deowanshi ........... H04L 47/745

FOREIGN PATENT DOCUMENTS

| | | | |
|---|---|---|---|
| CN | 114902182 | A | 8/2022 |
| EP | 2893685 | B1 | 7/2017 |
| EP | 3429156 | A1 | 1/2019 |
| EP | 3271857 | B1 | 4/2020 |
| WO | 2014/039921 | A1 | 3/2014 |
| WO | 2018/010791 | A1 | 1/2018 |
| WO | 2021/145894 | A1 | 7/2021 |
| WO | 2021/150306 | A1 | 7/2021 |
| WO | 2021/150307 | A1 | 7/2021 |
| WO | 2021/174104 | A1 | 9/2021 |

OTHER PUBLICATIONS

Anonymous: "Oracle Cloud Infrastructure Documentation—Overview of IAM", Feb. 8, 2023, XP093184083.
Anonymous: "Oracle Cloud Infrastructure Documentation—Renaming a Cloud Account", May 14, 2021, XP093185071.
Anonymous: "Oracle Cloud Infrastructure Documentation—Site-to-Site VPN Overview", Feb. 8, 2023, XP093184733.

(56) References Cited

OTHER PUBLICATIONS

Anonymous: "Oracle Cloud Infrastructure Documentation—Billing and cost management overview", Dec. 20, 2022, XP093183514.
Anonymous: "Oracle Cloud Infrastructure Documentation—Cloud Guard concepts", Jan. 18, 2022, XP093183028.
Anonymous: "Oracle Cloud Infrastructure Documentation—Getting Started with Policies", Jan. 4, 2023, XP093184099.
Anonymous: "Oracle Cloud Infrastructure Documentation—Getting Summary Information on the Overview Page", Aug. 16, 2022, XP093183031.
Anonymous: "Oracle Cloud Infrastructure Documentation—Learn Best Practices for Set ting Up Your Tenancy", Feb. 8, 2023, XP093184095.
Anonymous: "Oracle Cloud Infrastructure Documentation—Managing Compartments", Feb. 8, 2023, XP093184098.
Anonymous: "Oracle Cloud Infrastructure Documentation—Monitoring Threats", Sep. 28, 2022, XP093183035.
Anonymous: "Oracle Cloud Infrastructure Documentation—Overview of the Console Dashboards Service", Mar. 14, 2023, XP093184740.
Anonymous: "Oracle Cloud Infrastructure Documentation—Prerequisites for Oracle Platform Services on Oracle Cloud Infrastructure", Mar. 23, 2023, XP093185058.
Anonymous: "Oracle Cloud Infrastructure Documentation—Welcome to Oracle Cloud Infrastructure", Mar. 23, 2023, XP093182493.
Anonymous: "Oracle Gen 2 Exadata Cloud@Customer Security Controls", Jan. 11, 2023, XP093181973.
Anonymous: "Oracle Operator Access Control Configuration and Administration Guide", Nov. 18, 2022, XP093181896.
Anonymous: "Oracle Public Sector Licensing and Permitting", 2022, XP093184298.
Anonymous: "Oracle Sovereign Cloud", Feb. 15, 2023, XP093184649.
Apps2fusion: "Security Roles in Oracle Fusion Cloud SLA", Nov. 30, 2018, XP093184293.
Magouryrk Clay: "Announcing Oracle Alloy: The power of the cloud in your hands", Oct. 18, 2022, XP093183485.
Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).
"Create a Reseller and Reseller Administrator User", Retrieved from https://abiquo.atlassian.net/wiki/spaces/ABI54/ pages/310740667/ Create+a+Reseller+and+Reseller+Administrator+User, May 3, 2022, pp. 1-5.
"General Variables for All Requests", Jun. 28, 2023, pp. 6.
"Overview of Access Approval", Retrieved from https://cloud.google.com/assured-workloads/access-approval/docs/ overview, Jun. 6, 2024, pp. 5.
"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.
"Policy Syntax", Jan. 4, 2023, pp. 7.
"Reinstate admin privileges for a customer's Azure CSP subscriptions", Retrieved from https://learn.microsoft.com/en-us/partner-center/reinstate-csp, Aug. 1, 2023, pp. 7.
"Tenant administrator settings", Retrieved from https://backstage.forgerock.com/docs/idcloud/latest/tenants/tenant-administrator-settings.html, Jun. 7, 2023, pp. 12.
"Verbs", Jun. 5, 2023, pp. 2.
Anonymous: "Tokenization—(data security)", Wikipedia, February 1 2, 2023, pp. 1-12.
Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.
Ducharme et al., "Seamlessly Protect Your IBM Cloud Application Infrastructure with Privileged Access Gateway", Oct. 3, 2022, pp. 13.
George et al., "Data anonymization and integrity checking in cloud computing", 2013 Fourth International Conference on Computing, Communications and Networking Technologies (ICCCNT), Jul. 2013, pp. 5.
Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.
Soldani et al., "Anomaly Detection and Failure Root Cause Analysis in (Micro) Service-Based Cloud Applications: A Survey", ACM Computing Surveys, vol. 55, No. 3, Article 59, Feb. 2022, pp. 1-39.

* cited by examiner

SYSTEM AND METHOD FOR PROVIDING MULTI-TIERED REPORTING IN A REALM OF A CLOUD ENVIRONMENT

INCORPORATION BY REFERENCE; DISCLAIMER

Each of the following applications are hereby incorporated by reference: application Ser. No. 18/639,806, filed Apr. 18, 2024; U.S. Provisional Patent Application No. 63/462,878, filed Apr. 28, 2023. The applicant hereby rescinds any disclaimer of claims scope in the parent application(s) or the prosecution history thereof and advises the USPTO that the claims in the application may be broader than any claim in the parent application(s).

TECHNICAL FIELD

Embodiments described herein are generally related to systems and methods for providing cloud environments for use by tenants of a cloud infrastructure environment in accessing software products, services, or other offerings associated with the cloud environment, including providing a multi-tier module for multi-tiered usage reporting in one or more realms of a cloud environment.

BACKGROUND

A cloud computing environment can be used to provide access to a range of complementary cloud-based components, such as software applications or services, that enable organizations or enterprise customers to operate their applications and services in a highly-available hosted environment.

The benefits to an organization in moving their application and service needs to a cloud environment include a reduction in the cost and complexity of designing, building, operating, and maintaining their own on-premise data center, software application framework, or other information technology infrastructure; allowing them to instead focus on managing their day-to-day business.

SUMMARY

Embodiments described herein are generally related to systems and methods for providing cloud environments such as dedicated or private label cloud (PLC) environments, for example, for use by tenants of a cloud infrastructure environment in accessing software products, services, or other offerings associated with the environment, including providing a multi-tier module in a realm of a cloud environment.

In accordance with an embodiment, the system can include a system providing tiered assessment of use of services in a cloud environment.

In accordance with an embodiment, the system providing tiered assessment of use of services in a cloud environment can include one or more computers comprising one or more microprocessors, an operator cloud environment running on the one or more computers, wherein the operator cloud environment is deployed within a first realm owned by an operator tenant of the realm, a set of software products provided to the first realm from a cloud infrastructure provider of the cloud environment for access via the first realm by a plurality of end users as vendor cloud services, and a metering service.

In accordance with an embodiment, a method provides within a cloud environment a plurality of services deployed within one or more realms of the cloud environment. A multi-tiered reporting service is provided within a first realm, wherein a multi-tiered reporting service is operable to monitor usage of the services within the first realm. Usage data is received by the multi-tiered reporting service, wherein the usage data records usage, by user entities within the first realm, of the plurality of services The usage data includes identification data associating the user entities with their usage of the services within the first realm. The usage data is provided as a first set of data to a first entity associated with control of the first realm, and the multi-tiered reporting service generates a second set of data by processing the usage data to remove or convert the identification data. Further in the method, the second set of data is provided to a second entity associated with control of the cloud environment.

In accordance with an embodiment, the metering service of the system providing the tiered assessment of the use of the services in the cloud environment can be configured to receive end user consumption information from the vendor cloud services wherein the end user consumption information is representative of use by each of the plurality of end users of the vendor cloud services, deliver first end user consumption information representative of use by a first end user of the vendor cloud services to the first end user, deliver second end user consumption information representative of use by a second end user of the vendor cloud services to the second end user, aggregate the first and second end user consumption information as aggregated end user consumption information, and deliver the aggregated end user consumption information to the cloud infrastructure provider.

DETAILED DESCRIPTION

A cloud computing or cloud infrastructure environment can be used to provide access to a range of complementary cloud-based components, such as software applications or services, which enable organizations or enterprise customers to operate their applications and services in a highly-available hosted environment.

The benefits to an organization in moving their application and service needs to a cloud infrastructure environment include a reduction in the cost and complexity of designing, building, operating, and maintaining their own on-premise data center, software application framework, or other information technology infrastructure; allowing them to instead focus on managing their day-to-day business.

Cloud Infrastructure Environments

Figure 1:
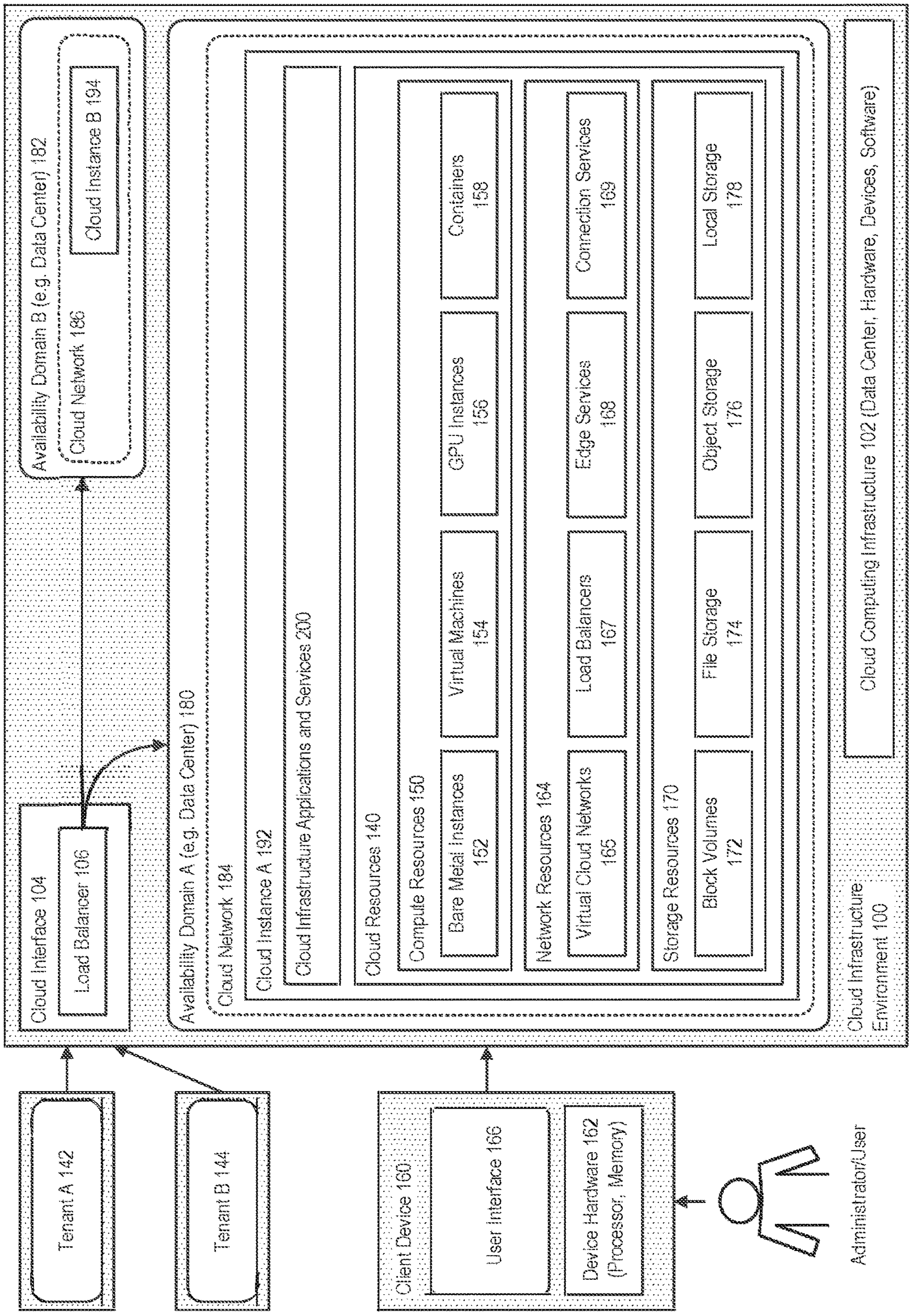
FIG. 1 illustrates a system for providing a cloud infrastructure environment, in accordance with an embodiment.
Figure 2:
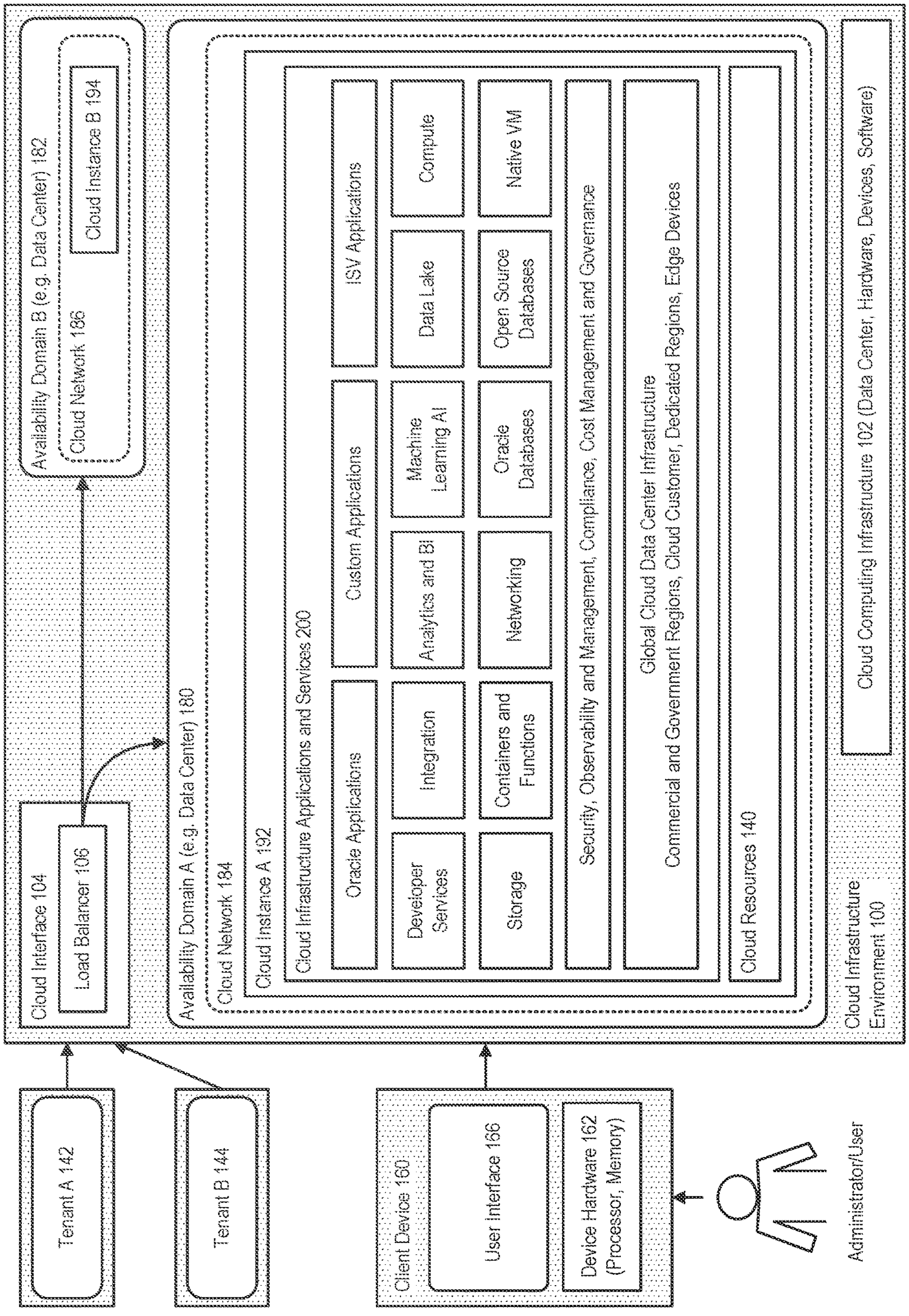
FIG. 2 further illustrates how a cloud infrastructure environment can be used to provide cloud-based applications or services or services, in accordance with an embodiment.

FIGS. 1 and 2 illustrate a system for providing a cloud infrastructure environment, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system.

The illustrated example is provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers 106.

In accordance with an embodiment, the cloud infrastructure environment supports the use of availability domains, such as, for example, availability domains A 180, B 182, which enables customers to create and access cloud networks 184, 186, and run cloud instances A 192, B 194.

In accordance with an embodiment, a tenancy can be created for each cloud tenant/customer, for example tenant A 142, B 144, which provides a secure and isolated partition within the cloud infrastructure environment within which the customer can create, organize, and administer their cloud resources. A cloud tenant/customer can access an availability domain and a cloud network to access each of their cloud instances.

In accordance with an embodiment, a client device, such as, for example, a computing device 160 having a device hardware 162 (e.g., processor, memory), and graphical user interface 166, can enable an administrator other user to communicate with the cloud infrastructure environment via a network such as, for example, a wide area network, local area network, or the Internet, to create or update cloud services.

In accordance with an embodiment, the cloud infrastructure environment provides access to shared cloud resources 140 via, for example, a compute resources layer 150, a network resources layer 164, and/or a storage resources layer 170. Customers can launch cloud instances as needed, to meet compute and application requirements. After a customer provisions and launches a cloud instance, the provisioned cloud instance can be accessed from, for example, a client device.

In accordance with an embodiment, the compute resources layer can comprise resources, such as, for example, bare metal cloud instances 152, virtual machines 154, graphical processing unit (GPU) compute cloud instances 156, and/or containers 158. The compute resources layer can be used to, for example, provision and manage bare metal compute cloud instances, or provision cloud instances as needed to deploy and run applications, as in an on-premises data center.

For example, in accordance with an embodiment, the cloud infrastructure environment can provide control of physical host (bare metal) machines within the compute resources layer, which run as compute cloud instances directly on bare metal servers, without a hypervisor.

In accordance with an embodiment, the cloud infrastructure environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the network resources layer can comprise a number of network-related resources, such as, for example, virtual cloud networks (VCNs) 165, load balancers 167, edge services 168, and/or connection services 169.

In accordance with an embodiment, the storage resources layer can comprise a number of resources, such as, for example, data/block volumes 172, file storage 174, object storage 176, and/or local storage 178.

As illustrated in FIG. 2, in accordance with an embodiment, the cloud infrastructure environment can include a range of complementary cloud-based components, for example as cloud infrastructure applications and services 200, that enable organizations or enterprise customers to operate their applications and services in a highly-available hosted environment.

By way of example, in accordance with an embodiment, a self-contained cloud region can be provided as a complete, e.g., Oracle Cloud Infrastructure (OCI) dedicated region within an organization's data center that offers the data center operator the agility, scalability, and economics of a public cloud, while retaining full control of their data and applications to meet security, regulatory, or data residency requirements.

For example, in accordance with an embodiment, such an environment can include racks physically and managed by a cloud infrastructure provider; customer's racks; access for cloud operations personnel for setup and hardware support; customer's data center power and cooling; customer's floor space; an area for customer's data center personnel; and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's public cloud regions, such as, for example, ERP, Financials, HCM, and SCM. A customer can seamlessly lift and shift legacy workloads using the cloud infrastructure provider's services, for example bare metal compute, VMs, and GPUs; database services, for example Autonomous Database; or container-based services, for example Container Engine for Kubernetes.

In accordance with an embodiment, a cloud infrastructure environment can operate according to infrastructure-as-a-service (IaaS) model that enables the environment to provide virtualized computing resources over a public network (e.g., the Internet).

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components (example services include billing software, monitoring software, logging software, load balancing software, or clustering software). Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not be, a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries, or daemons). This is often managed by the cloud infrastructure provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In accordance with an embodiment, IaaS provisioning may refer to acquiring computers or virtual hosts for use, and even installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 3:
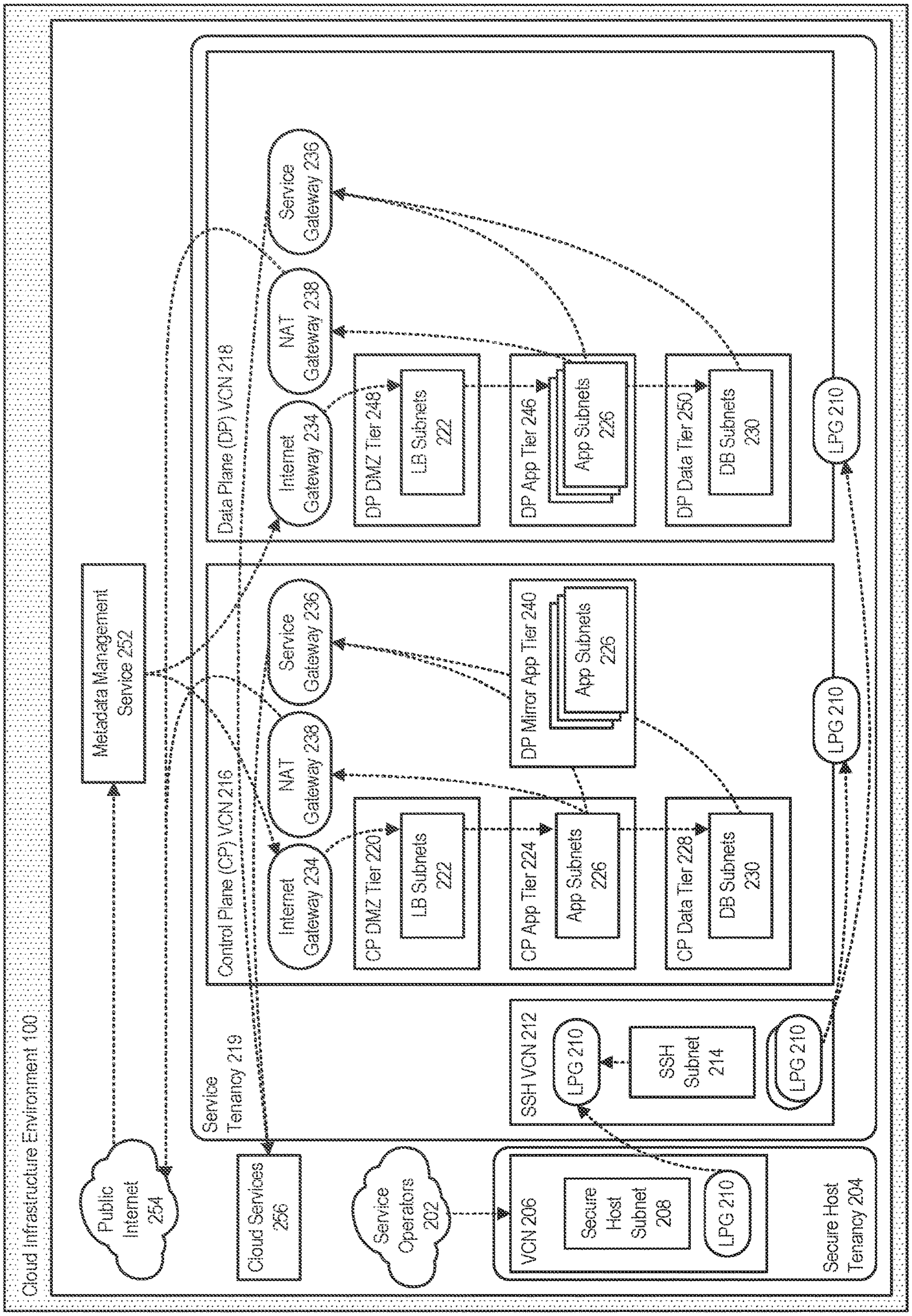
FIG. 3 illustrates an example cloud infrastructure architecture, in accordance with an embodiment.

FIG. 3 illustrates an example cloud infrastructure architecture, in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices, which may be portable handheld devices (e.g., a telephone, a computing tablet, a personal digital assistant (PDA)) or wearable devices (e.g., a head mounted display), running software such as Microsoft Windows, and/or a variety of mobile operating systems such as iOS, Android, and the like, and being Internet, e-mail, short message service (SMS), or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Chrome. Alternatively, or in addition, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnet(s) 222, a control plane app tier 224 that can include app subnet(s) 226, and a control plane data tier 228 that can include database (DB) subnet(s) 230 (e.g., frontend DB subnet(s) and/or backend DB subnet(s)). The LB subnet(s) contained in the control plane DMZ tier can be communicatively coupled to the app subnet(s) contained in the control plane app tier, and an Internet gateway 234 that can be contained in the control plane VCN, and the app subnet(s) can be communicatively coupled to the DB subnet(s) contained in the control plane data tier and a service gateway 236 and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier 246, a data plane DMZ tier 248, and a data plane data tier 250. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way: the service gateway can make API calls to cloud services, and cloud services can send requested data to the service gateway. Generally, cloud services may not initiate API calls to the service gateway.

In accordance with an embodiment, the secure host tenancy can be directly connected to the service tenancy, which may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example create, read, update, or delete (CRUD) operations, through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both of which may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage, which may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy, which may be isolated from the public Internet.

Figure 4:
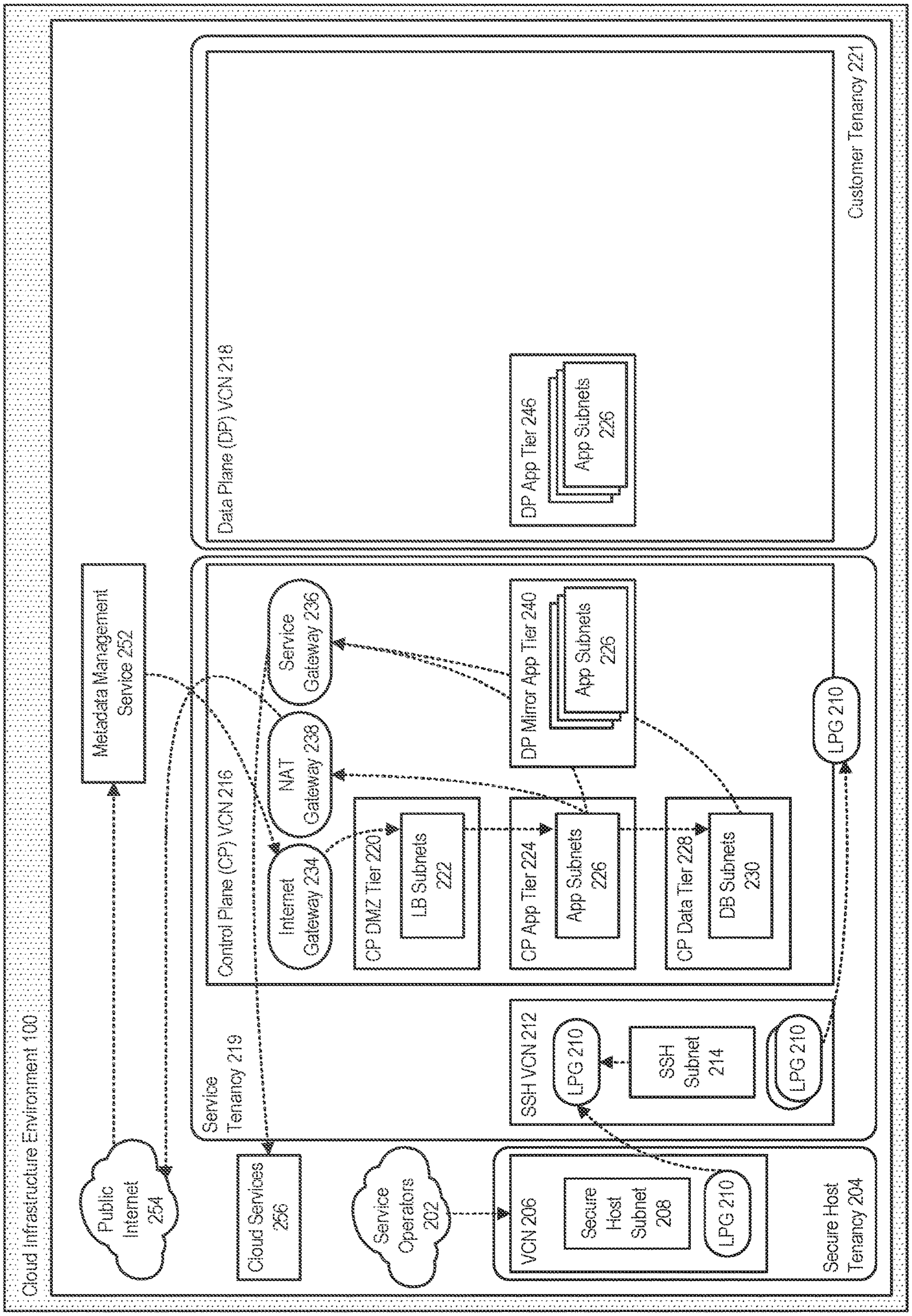
FIG. 4 illustrates another example of a cloud infrastructure architecture, in accordance with an embodiment.

FIG. 4 illustrates another example of a cloud infrastructure architecture, in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources that are provisioned in the control plane VCN that is contained in the service tenancy, to be deployed or otherwise used in the data plane VCN that is contained in the customer tenancy.

In accordance with an embodiment, a customer of the cloud infrastructure provider may have databases that are managed and operate within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, of the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a “Region 1,” and a cloud service “Deployment 1,” may be located in Region 1 and in “Region 2.” If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with Deployment 1 in Region 2.

Figure 5:
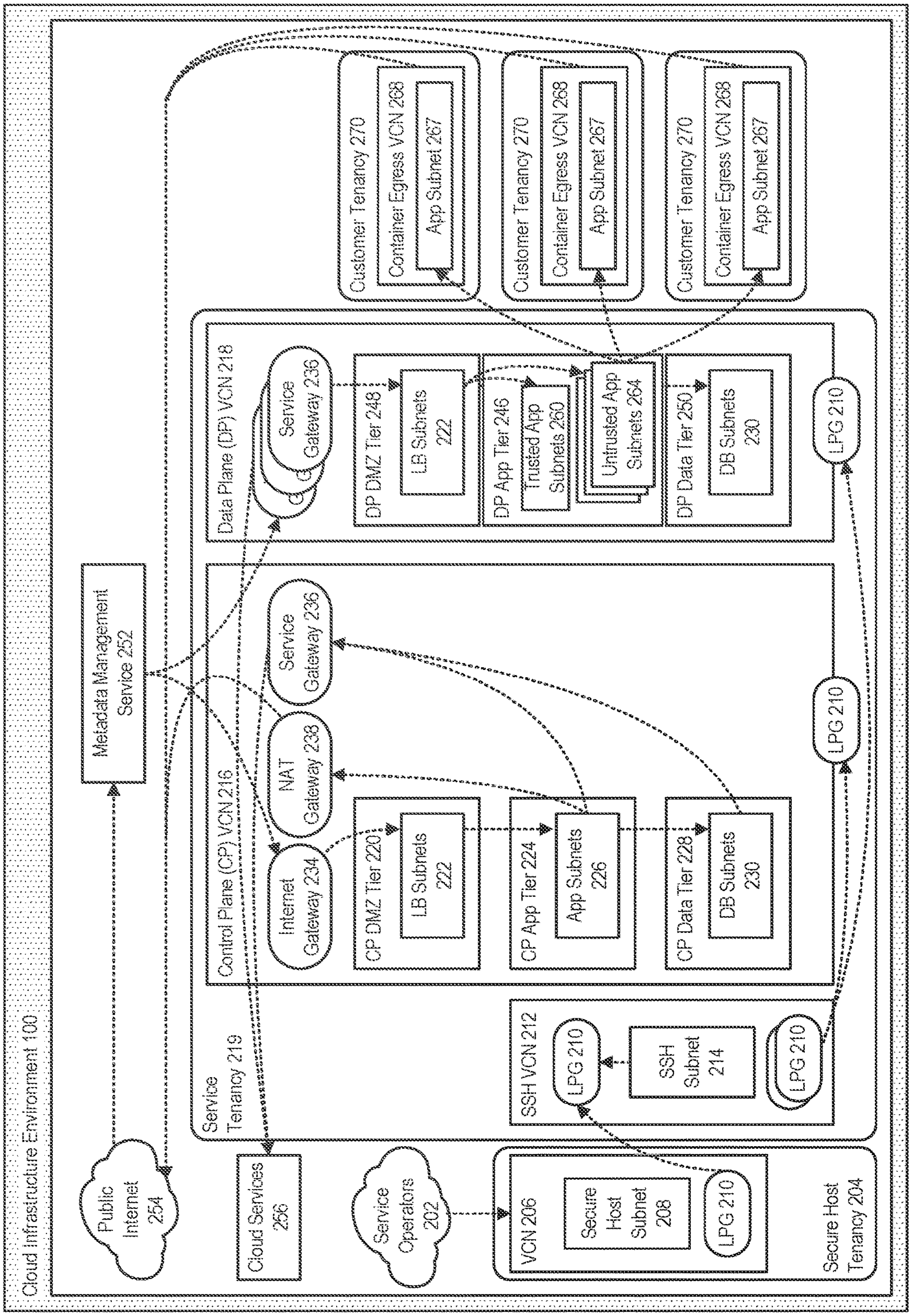
FIG. 5 illustrates another example of a cloud infrastructure architecture, in accordance with an embodiment.

FIG. 5 illustrates another example of a cloud infrastructure architecture, in accordance with an embodiment.

As illustrated in FIG. 5, in accordance with an embodiment, the trusted app subnet(s) 260 can be communicatively coupled to the service gateway contained in the data plane VCN, the NAT gateway contained in the data plane VCN, and DB subnet(s) contained in the data plane data tier. The untrusted app subnet(s) 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs, and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)), which may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s), and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled; or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
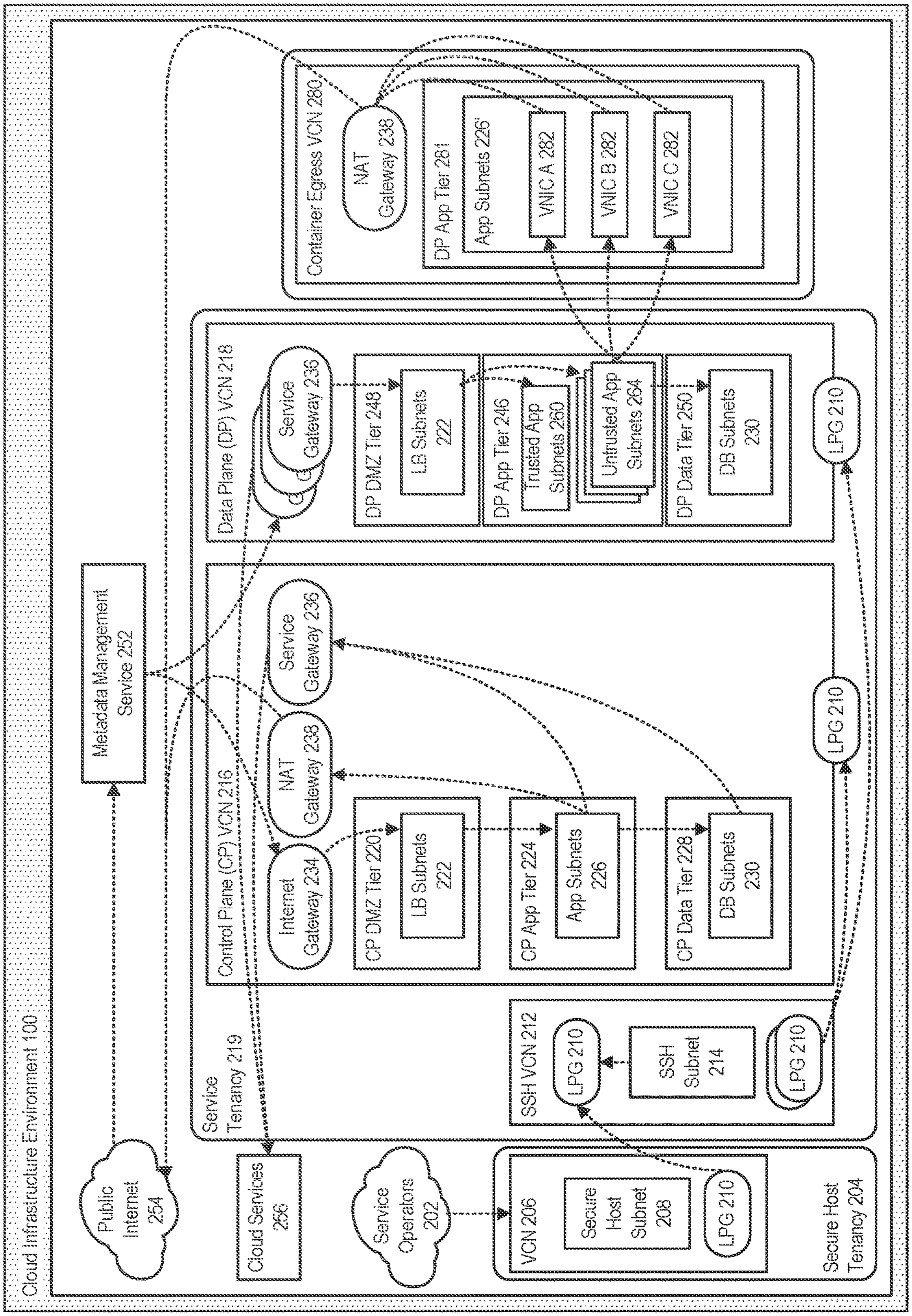
FIG. 6 illustrates another example of a cloud infrastructure architecture, in accordance with an embodiment.

FIG. 6 illustrates another example of a cloud infrastructure architecture, in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container, and be communicatively coupled to an app subnet that can be contained in a data plane app tier 281 that can be contained in a container egress VCN 280. Respective secondary VNICs 282 (1)-(N) can facilitate communication between the untrusted app subnet (s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that requests a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Cloud Environments

In accordance with an embodiment, a cloud infrastructure environment can be used to provide dedicated cloud environments, for example as one or more private label cloud environments, for use by tenants of the cloud infrastructure environment in accessing subscription-based software products, services, or other offerings associated with the cloud infrastructure environment.

Figure 7:
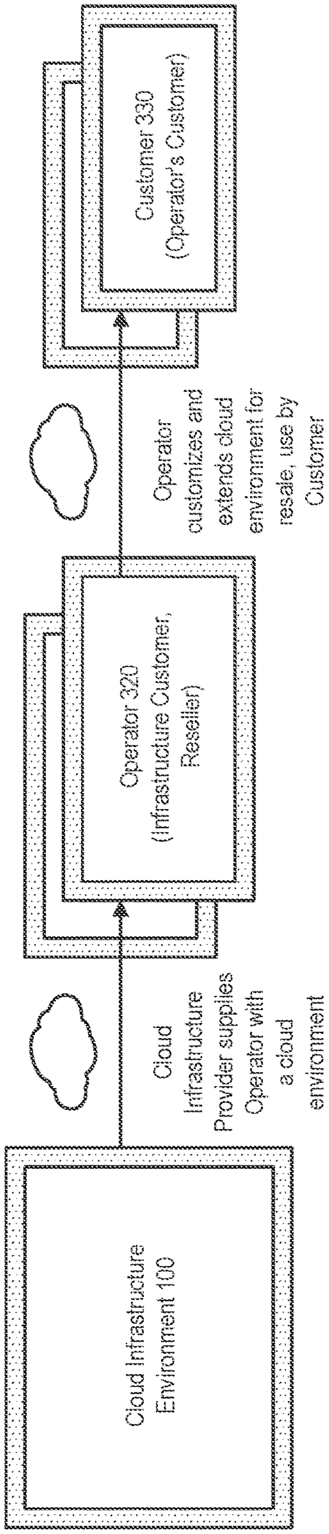
FIG. 7 illustrates a system that provides dedicated or private label cloud environments, for use by tenants or customers of a cloud infrastructure environment, in accordance with an embodiment.

FIG. 7 illustrates how the system can provide dedicated or private label cloud environments, for use by tenants or customers of a cloud infrastructure environment, in accordance with an embodiment.

Although several of the examples described herein illustrate various systems, methods, and/or techniques as may be used in the context of providing private label cloud (PLC) environments, in accordance with various embodiments, the systems, methods, and techniques described herein can be used, within or with other types of cloud environments.

As illustrated in FIG. 7, in accordance with an embodiment, a cloud infrastructure provider can supply an operator 320, for example a cloud infrastructure customer operating as a reseller, with one or more cloud environments (e.g., a PLC environment) or realms. The operator/reseller can then customize and extend the cloud environment for use by (their) customer 330, for use in accessing subscription-based software products, services, or other offerings associated with the cloud infrastructure environment.

For purposes of illustration, examples of such subscription-based products, services, or other offerings may include various cloud infrastructure software products, such as Oracle Fusion Applications products, or other types of products or services that allow customers to subscribe to usage of those products or services.

Figure 8:
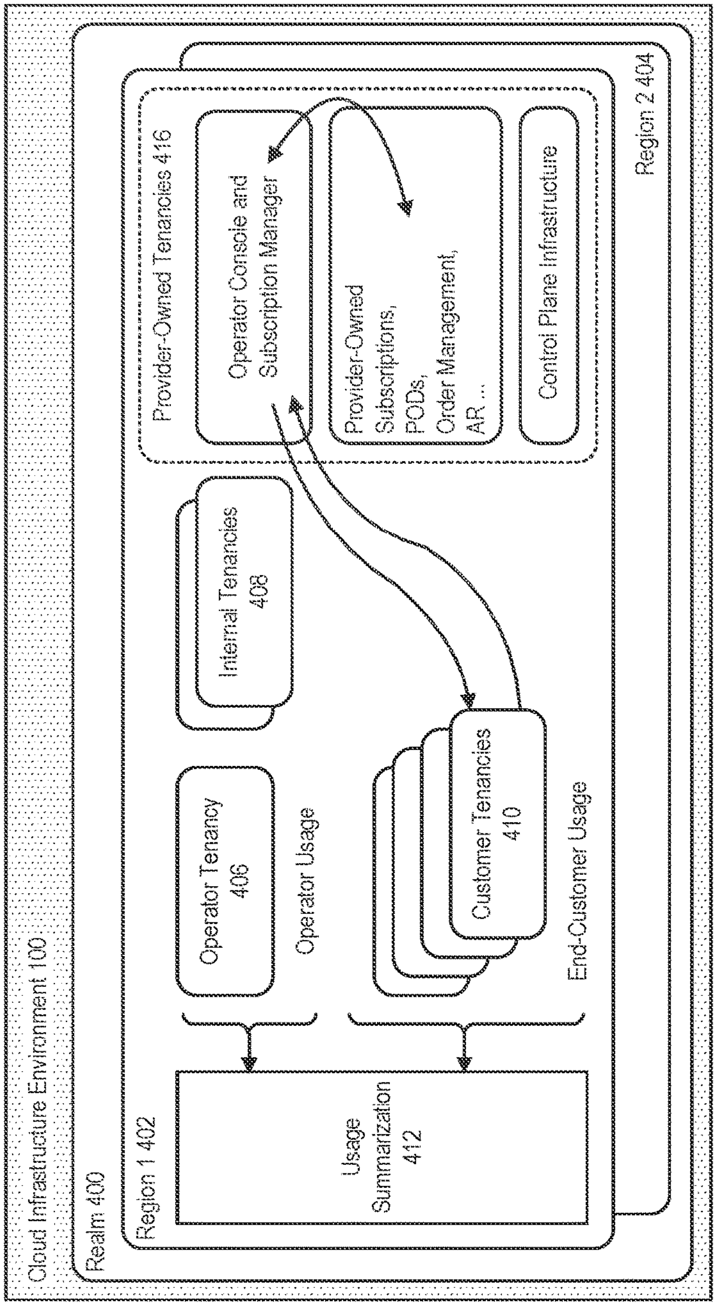
FIG. 8 further illustrates the use of cloud realms, for use by tenants or customers of a cloud infrastructure environment, in accordance with an embodiment.

FIG. 8 further illustrates the use of cloud realms, for use by tenants or customers of a cloud infrastructure environment, in accordance with an embodiment.

As illustrated in FIG. 8, in accordance with an embodiment, the system can include a cloud subscription service or component, referred to herein in some embodiments as a subscription manager, that exposes one or more subscription management APIs for creating orders used to onboard new customers, or to launch a workflow that creates a subscription and orchestrates billing and pricing service or other components for use with a cloud realm 400.

In accordance with an embodiment, when an operator (e.g., a PLC operator) or their customer requests a cloud environment, the system creates a realm, for use within a region 402, 404; together with one or more provider-owned tenancies 416. These tenancies allow a region to function with its required service infrastructure; and are administered by the cloud infrastructure provider.

In accordance with an embodiment, a first step in the process is to create an operator tenancy 406 for the operator, before the region and associated realms are turned over to them for subsequent management. The operator then becomes the administrator of this tenancy, within which they can view and manage everything that happens within that region, including their customer accounts and usage 412 by those customers of cloud resources.

Generally, once the region has been turned over or provided to the operator, the cloud infrastructure provider cannot subsequently access the data within the operator tenancy, unless the operator authorizes the cloud infrastructure provider to do so, for example to provide troubleshooting of issues that may arise.

In accordance with an embodiment, the operator can then create additional internal tenancies 408, intended for their own use internally, for example to assess what the end user or customer experience will be, or to provide a sales demo tenancy, or to operate a database for their own internal use. The operator can also create one or more customer tenancies 410, of which the end user or customer will be the administrator. Cloud infrastructure usage, for example compute, storage, and other infrastructure resources, is consolidated by operator, reflecting both their usage and that of their customers, and reported to the cloud infrastructure provider.

In accordance with an embodiment, a user interface or console can be provided that allows the operator to manage its customer accounts and customer-offered services. A cloud infrastructure provider can also use a cloud infrastructure tenancy, for example a Fusion Applications tenancy, to install any needed infrastructure services for use by the operator and their customers.

Figure 9:
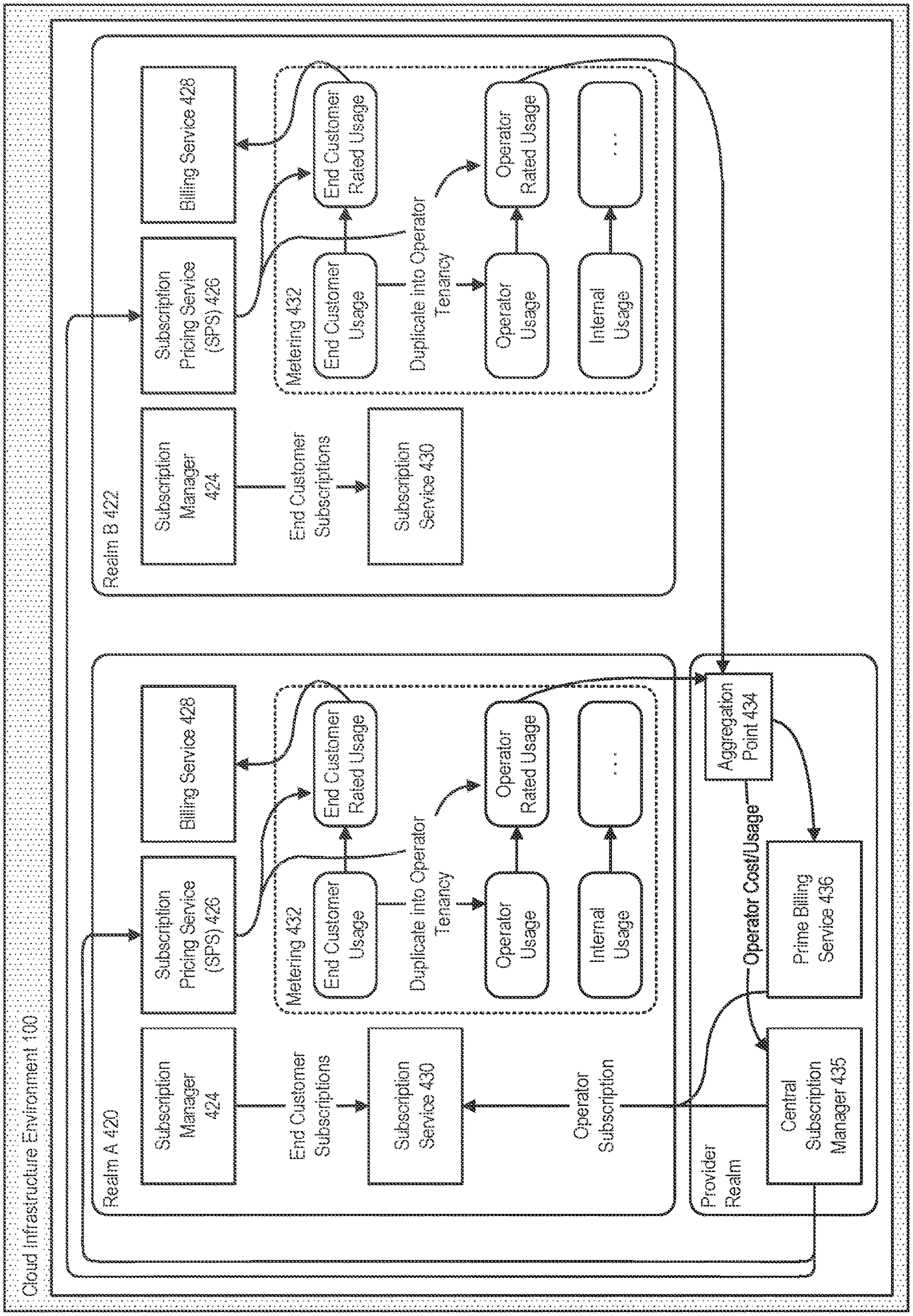
FIG. 9 further illustrates the use of cloud realms, for use by tenants or customers of a cloud infrastructure environment, in accordance with an embodiment.

FIG. 9 further illustrates the use of cloud realms, for use by tenants or customers of a cloud infrastructure environment, in accordance with an embodiment.

As illustrated in FIG. 9, in accordance with an embodiment, a subscription manager 424 service or component exposes one or more subscription management APIs for creating orders used to onboard new customers, or to launch a workflow that creates a subscription and orchestrates billing and pricing service or other components.

In accordance with an embodiment, the system can also include a billing service 428 or component that operates upon a billing account or logical container of subscriptions and preferences used to produce an invoice for a customer.

In accordance with an embodiment, the system can also include a subscription pricing service (SPS) 426 or component, which operates upon a product catalog that defines which products can be purchased by a customer, and can be used to provide a price list (e.g., a rate card) that the pricing service also owns.

In accordance with an embodiment, to support the sales process through which a subscription is created in a realm 420, 422, products can be selected from a product hub. Once an order is created via a subscription service 430, a subscription is created in the subscription manager which thereafter manages the life cycle of that subscription, and provisions what needs to be provisioned in downstream services. The SPS component then manages the aspects of pricing and usage, for use in charging the end cost to the operator or their ability to charge their customers. Usage events are forwarded to the billing service or component, where depending on the billing preferences of the subscription, invoices are created and pushed to an accounts receivables component.

In accordance with an embodiment, although the services that are offered in a realm report their usage to a metering service or component 432, such usage does not have any price associated with it. A rating process determines how much each specific event costs, for example by applying rate cards, determines a unit and cost for that subscription, associates the cost to that record, and then forwards that to the billing service or component.

As further illustrated in FIG. 9, in accordance with an embodiment, an operator may control multiple realms A, B—for example an operator that operates in multiple countries may wish to operate a data center that is completely isolated for the United States of America, and a separate data center that is completely isolated for Europe, for example to address governance or regulatory requirements. In accordance with an embodiment, the usage associated with these multiple realms can be aggregated 434, for use by a central subscription manager 435, and where applicable a prime billing service 436, in billing the operator.

The examples of various systems illustrated above are provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Cloud Subscriptions

Figure 10:
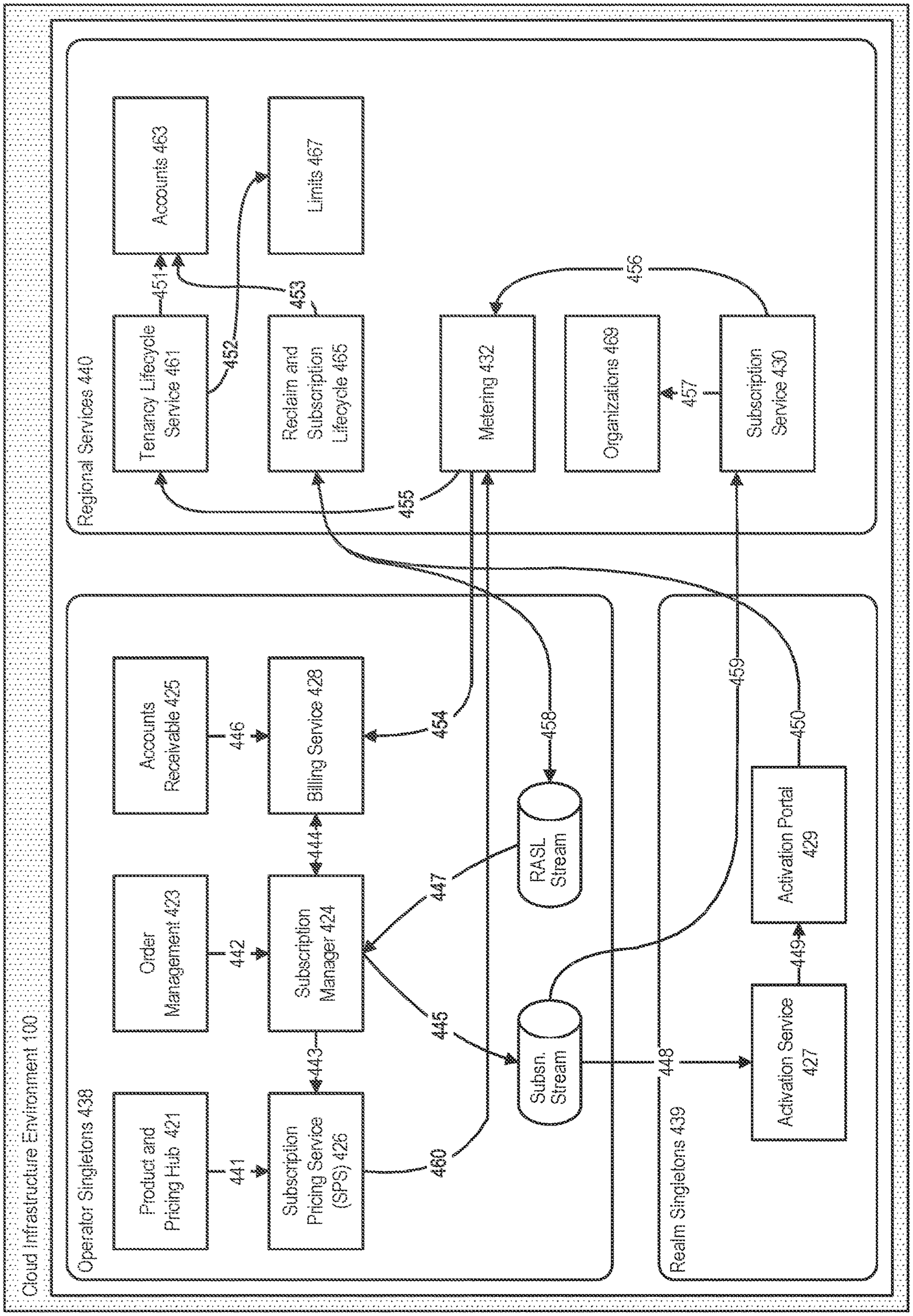
FIG. 10 illustrates a system for providing access to software products or services in a cloud computing or other computing environment, in accordance with an embodiment.

FIG. 10 illustrates a system for providing access to software products or services in a cloud computing or other computing environment, in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various cloud infrastructure software products or services that allow customers to subscribe to usage of those products or services.

In accordance with an embodiment, the environment can include a plurality of components provided as operator singletons 438, realm singletons 439, and regional services 440, as further described below.

In accordance with an embodiment, a subscription can include artifacts such as, for example, products, commits, billing model, and state. The subscription manager service or component can expose one or more subscription management APIs for creating orders used to onboard new customers, or to launch a workflow that creates a subscription and orchestrates creating the proper footprints in billing and pricing service or components, as further described below.

In accordance with an embodiment, the billing service or component operates upon a billing account or logical container of subscriptions and preferences used to produce an invoice. Each billing account generates one invoice per billing cycle. The billing service includes a first pipeline that accepts usage and cost from a metering service or component through a REST API, wherein billing writes the usage to a database from which billing workers aggregate and calculate balances; and a second pipeline responsible for taking the aggregated usage and commitments and calculating charges over a billing interval.

In accordance with an embodiment, the subscription pricing service (SPS) 426 or component operates upon a product catalog that defines which products can be purchased by a customer. The product catalog forms the backbone of a price list (i.e., rate card) that the pricing service also owns. Rate cards are modeled as pricing rules on top of public list prices. The pricing service maintains a single price list for all products, new product prices can be added, and existing prices changed. The price list has a full history, the latest version being the current rate card. Since some contracts may require a snapshot of the rate card be taken, the pricing service handles this by recording the time a customer's rate card is created, and then querying the price list at that time.

In accordance with an embodiment, the SPS or pricing service is responsible for communicating with a product and pricing hub 421, to provide information about products, global price list, and end user or customer's subscription specific price lists and discounts. For example, in accordance with an embodiment, SPS can synchronize product information from a product hub, and a global price list from a pricing hub.

In accordance with an embodiment, the subscription manager service or component operates as an upstream service to receive new order requests from an order management 423 component, for example from an Oracle Fusion Order Management environment. The subscription manager service or component can provide subscription information to the SPS service, including subscription details such as time of quote configured, or subscription type (Commitment, PayG), to help SPS to determine an effective base price (Rate Card) for the subscription. The subscription manager service or component can also send discounts for subscriptions received from the order management component, which SPS stores as a pricing rule entity.

In accordance with an embodiment, the SPS service runs as a background process to manage a rate cards service or component, which is responsible for generating rate cards for new subscriptions and updating those rate cards when new price changes occur. The SPS service can provide APIs to access rate cards and pricing rules. A metering in-line rating engine can utilize these APIs to obtain subscription-specific rate cards and pricing rules, and then use this data for cost calculations.

In accordance with an embodiment, additional SPS components can include, for example, a pricing/product hub integration component, that allows an operator entity providing subscription-based products, services, or other offerings within the environment, to manage their product and price list, for example as provided by a product hub and pricing hub respectively.

For example, in accordance with such an embodiment, an SPS product integration flow can listen to create/update events in the product hub and make calls to an SPS product API. Similarly, an SPS pricing integration flow can pull new price list creation from the pricing hub and call respective SPS pricing APIs.

In accordance with an embodiment, the system can also include an SPS core module that provides APIs to manage and access pricing entities. Pricing entities can be accessed by internal services, for example an inline rating engine.

In accordance with an embodiment, the system can also include a rate card manager component. The SPS service maintains the single base price for a product at a given time. However, product prices for subscription are dependent on a base price at quote configuration time and price list change policy attributes of subscriptions. The SPS service internally maintains the price to be used for subscription using these properties. All such price lists are grouped in a rate card. The rate card manager can create and maintain the rate card, listen to price list changes and update existing rate cards with the new price, and listen to new subscriptions and assigns the rate card based on subscription properties.

In accordance with an embodiment, the SPS service is responsible for managing pricing rules for a subscription, including discounts offered to an end user or customer. Pricing rules eligibility can be based on attributes of products, such as discount group, product category or specific SKUs. Internally SPS needs to identify the list of products for which these rules will be applicable. To accomplish this, a rule decoder engine can compile the pricing rules in a format such that an in-line rating engine can consume the information for cost calculation. This compilation process can be triggered when products or pricing rules are created or updated.

As illustrated by way of example in FIG. 10, in accordance with an embodiment: at 441, a product and price information managed in, e.g., Fusion Applications, is sent to the SPS component.

At 442, orders are sent to the subscription manager component to create subscriptions, rate cards and billing accounts.

At 443, pricing configuration and pricing rules are sent to SPS for new orders.

At 444, the subscription manager component is used to set up a billing account in the billing service or component.

At 445, the subscription manager component publishes events to an subscription manager streaming component.

At 446, a charge data is sent to an accounts receivable component 425 to generate invoices.

At 447, the subscription manager component consumes reclaim and subscription lifecycle (RASL) events from subscription manager streaming.

At 448, an activation service 427 reads the subscription manager event stream.

At 449, a customer obtains activation data from an activation portal 429.

At 450, a tenancy lifecycle service 461 provisions a tenancy as part of the subscription activation.

At 451, the tenancy lifecycle service creates, within an accounts 463 component, an accounts footprint during account provisioning.

At 452, the tenancy lifecycle service sets, within a limits service 467, a limits template during account provisioning.

At 453, the accounts component acts as a downstream RASL client to handle a legacy reclamation and subscription lifecycle 465.

At 454, aggregated cost and usage is sent to the billing service 428 or component.

At 455, an organization can create child tenancies using the tenancy lifecycle service.

At 456, a metering service 432 or component obtains subscription mapping data.

At 457, the subscription service 430 obtains organization data 469 for subscription mappings.

At 458, the RASL component reads the subscription manager event stream.

At 459, the subscription service reads the subscription manager event stream; and at 460, the metering service or component obtains a rate card data for each subscription, which can then be used in charging the end cost to the operator or their ability to charge their customers.

The above examples are provided for purposes of illustrating a computing environment which can be used to provide dedicated or private label cloud environments, for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Tiered Assessment of Use of Services in a Realm of a Cloud Infrastructure

Figure 11:
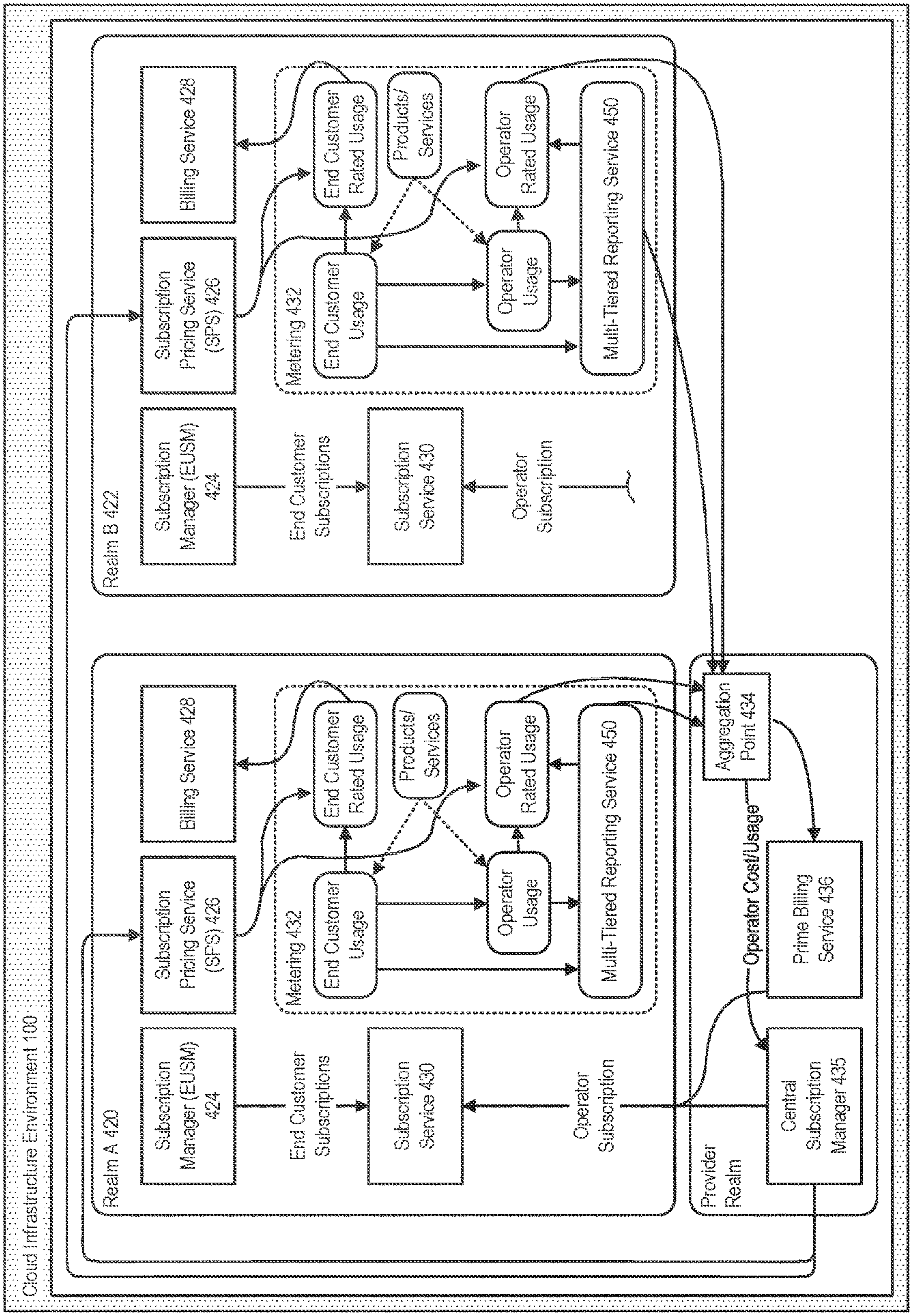
FIG. 11 illustrates a system for providing a tiered assessment of use of software products or services in a cloud computing or other computing environment, in accordance with an embodiment.

FIG. 11 illustrates a system for providing a tiered assessment of use of software products and/or services in a cloud computing or other computing environment, in accordance with an embodiment.

Overall and in accordance with an embodiment, the subject system provides methods and systems for multi-tiered metering of resource usage including a first tier resource usage metering that occurs at the operator level, within the operator's realm of the cloud infrastructure, and a second level of resource usage metering that occurs at the level of the cloud infrastructure provider.

Although several of the examples described herein illustrate various systems, methods, and/or techniques as may be used in the context of providing private label cloud (PLC) environments, in accordance with various embodiments, the systems, methods, and techniques described herein can be used, within or with other types of cloud environments.

In accordance with an embodiment, the first level metering provides operators with detailed resource usage information relative to the specific resources used by their one or more respective end users, the quantities of resources used by their one or more respective end users, and the timing of the resource uses of the resources by their one or more respective end users.

In accordance with an embodiment, the second level metering provides the cloud provider system with generalized resource usage information relative to the resources used by the realm operator and by the one or more respective end users of the realm operator. The generalized resource usage information is, however, anonymized relative to the one or more respective end users. In that way the cloud provider system is provided with resource usage information relative to the specific resources used that are attributable to the realm operator and end users of the realm operator, the quantities of resources used that are attributable to the realm operator and end users of the realm operator, and the timing of the resource uses that are attributable to the realm operator and end users of the realm operator.

Commercially the first level metering enables an operator to have direct control over product pricing offered to end users and also to have direct control over billing activities relating to those end users, and the second level of metering provides an accounting to the cloud provider system of all usage by the operator as well as of their customers, so that the operator may be in turn billed for the combined usage.

In accordance with an embodiment, the data relating to the combined usage by the operator and of their customers is anonymized. For usage relating to unique/proprietary infrastructure and platform services used by the customers of the operator, the accounting provided to the cloud infrastructure provider, e.g., OCI, includes only the portion of resource consumption that relates to any of the platform infrastructure and platform services that were needed or used to support the unique/proprietary infrastructure and platform services used by the customers of the operator.

In accordance with an embodiment, with continued reference to FIG. 11, the system illustrated provides tiered assessment of use of products and/or services in a cloud infrastructure environment. An operator cloud environment runs on the one or more computers, wherein the operator cloud environment is deployed within a first Realm A controlled or otherwise "owned" by the first realm operator.

In an example embodiment, the first realm may be, for example, a PLC realm, that is controlled by a first realm operator. A set of software products are provided to the first Realm A from a cloud infrastructure provider of the cloud environment for access via the first Realm A by a plurality of end users as vendor cloud services. A metering service 432 is configured to receive end customer usage information from the vendor cloud services, wherein the end customer usage information is representative of use or consumption by each of the plurality of end users of the vendor cloud services, and to deliver the end user consumption information representative of the use by the customer users of the vendor cloud services to the Realm A operator as well as to the cloud infrastructure provider.

In accordance with an embodiment, the metering service 432 is further configured to receive operator consumption information from the set of software products, the operator consumption information being representative of use by the Realm A operator of the set of software products. The metering service may sum the end user or customer consumption information with the operator consumption information as operator attributable consumption information, and deliver the operator attributable consumption information to the cloud infrastructure provider.

In accordance with an embodiment, an operator subscription manager service is provided for managing subscriptions of the operator to the set of software products, wherein the operator subscription manager is configured to transmit a request to the cloud infrastructure provider of the cloud environment to order one or more of the software products, whereby the one or more software products may be received from the cloud infrastructure provider into the first Realm A as the set of software products for selectively providing by the operator to the plurality of end users or end customers as the vendor cloud services.

In the example embodiment, the operator subscription manager is configured to fulfill the order by creating an operator subscription in the Realm A, wherein the operator subscription comprises operator subscription pricing attributes. In addition, the metering service further includes an operator rated usage service configured to receive operator consumption information from the set of software products, wherein the operator consumption information is representative of use by the operator of the set of software products. The operator rated usage service is further configured to determine, based on the operator subscription pricing attributes and a sum of the aggregated end user consumption information and the operator consumption information, a usage cost to the operator for the use by the operator and the set of end user customers of the set of software products. The usage cost to the Realm A operator taking into account the operator's own usage of the services or products as well as usage by the customers of the Realm A operator is delivered to the cloud infrastructure provider.

In accordance with an embodiment, an end user subscription manager is provided to the operator in the Realm A for managing subscriptions of the plurality of end users to the vendor cloud services. In the example embodiment, the subscription manager is configured to receive requests from the end user customers to order sets of the vendor cloud services, and to fulfill the orders of the requests by creating end user customer subscriptions in the subscription manager, wherein the end user customer subscriptions provide access by the end user customers to the desired sets of vendor cloud services.

In accordance with an embodiment, the system provides tiered assessment of use of software products or services in a cloud computing or other computing environment as between usage by the Realm A operator as well as between a plurality of different end user customers. In this regard, a first end user subscription of a first end user customer may comprise first end user pricing attributes and, similarly, a second end user subscription of a second different end user customer may comprise second end user pricing attributes. The metering service includes an end user customer rating service configured to determine, based on first end user pricing attributes and the first end user consumption information, a usage cost to the first end user for the use by the first end user of the first set of vendor cloud services, and also to determine, based on the second end user pricing attributes and the second end user consumption information, a usage cost to the second end user for the use by the second end user of the second set of vendor cloud services.

In accordance with an embodiment, the metering service of the system further includes a billing service configured to deliver to the first end user the usage cost to the first end user for the use by the first end user of the first set of vendor cloud services, and also deliver to the second end user the usage cost to the second end user for the use by the second end user of the second set of vendor cloud services.

In accordance with an embodiment, the system further includes an end user customer rated usage service configured to determine, based on the first end user pricing attributes and the first end user consumption information, a usage cost to the first end user for the use by the first end user of the first set of vendor cloud services, whereby the end user customer may be billed for usage via a billing service.

In accordance with an embodiment, the system is configured to anonymize the end user customer consumption information of end user identification information and of end user pricing attributes as anonymized end user consumption information. The anonymized end user consumption information may be delivered to the cloud infrastructure provider.

In accordance with an embodiment, the metering service of the system may further include an operator rated usage service configured to receive operator consumption information from the set of software products, the operator consumption information being representative of use by the operator of the set of software products, and to determine, based on the operator subscription pricing attributes, the operator consumption information, and the anonymized end user consumption information, a usage cost to the Realm A operator for the use by the Realm A operator and the set of end user customers of the Realm A operator of the set of software service or products. The usage cost to the Realm A operator may be delivered to the operator of the cloud infrastructure provider for appropriate billing through a subscription manager prime billing service.

In accordance with an embodiment, the system illustrated providing the tiered assessment of use of the services and/or products in the cloud infrastructure environment 100 may include one or more computers comprising one or more microprocessors, wherein the cloud environment 100 may run on the one or more computers. A plurality of products and/or services are deployed within one or more the realms of the cloud environment such as for example in Realm A and Realm B. A multi-tiered reporting service 475 is provided within the first Realm A, wherein the multi-tiered reporting service is operable to monitor usage of the services within the first Realm A. Similarly, a multi-tiered reporting service 475 may be provided within the second Realm B, wherein the multi-tiered reporting service is operable to monitor usage of the services within the second Realm B.

Overall, in the example embodiment and focusing on the first Realm A, the multi-tiered reporting services 475 receives usage data that records usage, by user entities within the first Realm A, of the plurality of services, wherein the usage data comprising identification data associating the user entities with their usage of the services within the first Realm A. The usage data is provided by the multi-tiered reporting service to a first entity associated with control of the first Realm A as a first set of data. The multi-tiered reporting service generates a second set of data by processing the usage data to remove or convert the identification data, wherein the second set of data is provided to a second entity associated with control of the cloud environment.

In the example embodiment illustrated the first entity may be an operator associated with control of the first Realm A, and a second entity may be an operator associated with control of the second Realm B.

In an example embodiment, the first entity may be a first operator associated with control of the first Realm A, wherein the first Realm A may be a first PLC realm, and the second entity may be a second operator associated with control of the second Realm B wherein the second Realm B may be a second PLC realm of the cloud infrastructure. Also in the example embodiment, the second entity may be a cloud infrastructure provider associated with overall control of the cloud environment 100.

It may be appreciated that in accordance with an embodiment the multi-tiered reporting service is preferably operable to generate the second set of data by replacing references in the usage data to the user entities with references to the first entity.

It is also to be appreciated that the multi-tiered reporting service is preferably operable to generate the second set of data by reformatting the usage data that records the usage by the user entities of the plurality of services to conform with a record of usage by the second entity of the plurality of services.

In accordance with an embodiment, a second multi-tiered reporting service 475 may be provided within a second Realm B, wherein the second multi-tiered reporting service is operable to monitor usage of the services and/or within the second Realm B, wherein the first entity may also be associated with control of the second Realm B. in the example embodiment the second multi-tiered reporting service 475 operating within the second Realm B receives a usage data that records usage, by user entities within the second Realm B, of the plurality of services, wherein the usage data comprises identification data associating the user entities with their usage of the services within the second Realm B.

In accordance with an embodiment, the second multi-tiered reporting service 475 operating within the second Realm B generates a modified set of usage data, by processing the usage data to remove or convert the identification data. The multi-tiered reporting service is further operable to combine modified sets of usage data received from both the first and second Realms A and B, describing usage by the user entities within the first and second Realms A and B, to generate an aggregated usage data, wherein the multi-tiered reporting services are operable to provide the aggregated usage data to the second entity associated with the cloud environment. In the example embodiment illustrated the multi-tiered reporting service 475 may be distributed across the first and second Realms A and B. Alternatively, the multi-tiered reporting service 475 may be provided as instances of a reporting service that cooperate to generate the aggregated usage data, and to provide the aggregated usage data to the second entity associated with the cloud environment.

In the example embodiment the multi-tiered reporting service is operable to communicate, from the second entity associated with control of the cloud environment, to the first entity associated with control of the first realm, one or more rules or policies that are stored within the first realm and modify an operation of the multi-tiered reporting service in monitoring the usage of the services within the first realm. The first entity may be a realm operator for example, and the second entity may be a cloud infrastructure provider for example.

In accordance with an embodiment, the multi-tiered reporting service is further configured to receive first entity consumption information from the plurality of services, the first entity consumption information being based on the usage data that is representative of the usage by the user entities within the first realm of the plurality of services, receive second entity consumption information from the plurality of services, the second entity consumption information being representative of use by the second entity of the plurality of services, sum the first entity consumption information with the second entity consumption information as summed cloud environment consumption information, and deliver the summed cloud environment consumption information to the second entity associated with control of the cloud environment.

In accordance with an embodiment, the system further includes an operator subscription service 430 operable to manage subscriptions of the first entity to the plurality of services, wherein the operator subscription service is configured to transmit a request to the second entity associated with control of the cloud environment to order one or more of the plurality of services, and receive the one or more services into the first realm as the plurality of services for selectively providing by the first entity to the user entities as vendor cloud services.

It may be appreciated that in accordance with an embodiment the operator subscription service 430 is operable to fulfill the order by creating a first entity subscription in the operator subscription service, the first entity subscription comprising first entity subscription pricing attributes representative of pricing to the first entity for use of one or more of the plurality of services, and user entity subscription pricing attributes representative of pricing to the user entities for use by the user entities of one or more of the plurality of services.

In addition to the above, in accordance with an embodiment, the subscription manager service or component 424 further includes or operates as an end user subscription manager (EUSM) to manage subscriptions of the user entities to the plurality of services, the EUSM being configured to receive from a first user entity a first request to order a first set of the plurality of services, and receive from a second user entity a second request to order a second set of the plurality of services. The subscription manager/EUSM service or component is further operable to fulfill the order of the first request by creating a first user entity subscription in the EUSM, wherein the first user entity subscription provides access by the first user entity to the first set of cloud services. The EUSM is still further operable to fulfill the order of the second request by creating a second user entity subscription in the EUSM, wherein the second user entity subscription provides access by the second user entity to the second set of cloud services.

Figure 12:
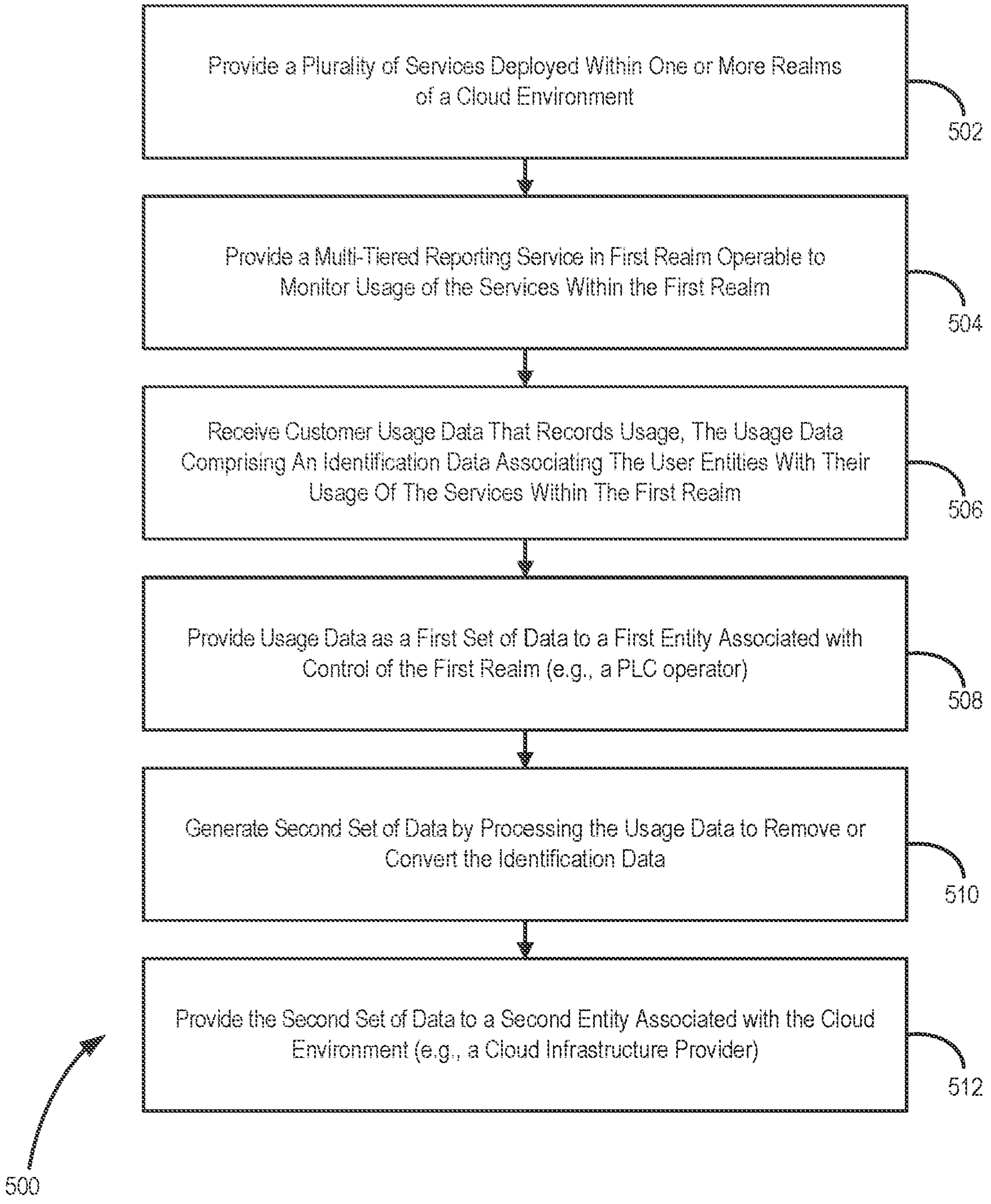
FIG. 12 is a flow diagram illustrating a method for providing a tiered assessment of use of software products or services in a cloud computing or other computing environment, in accordance with an embodiment.

FIG. 12 is a flow diagram illustrating a method 500 for providing a tiered assessment of use of software products or services in a cloud computing or other computing environment, in accordance with an embodiment.

As illustrated in FIG. 12, in accordance with an embodiment, a plurality of services are deployed at 502 within one or more realms of a cloud environment running on one or more computers comprising one or more microprocessors.

A multi-tiered reporting service is provided at 504 within the first realm. In accordance with embodiment, the multi-tiered reporting service provided within the first realm is operable to monitor usage of the services within the first realm.

Customer usage data is received at 506 by the multi-tiered reporting service that was provided at 504 within the first realm. In accordance with an example embodiment, the usage data records usage, by user entities within the first realm, of the plurality of services. The usage data may include, for example identification data associating the user entities with their usage of the services within the first realm.

The usage data is provided at 508 to a first entity associated with control of the first realm. In accordance with an example embodiment, the first entity may be, for example, a PLC operator.

At 510, the multi-tiered reporting service generates a second set of data by processing the usage data to remove or convert the identification data. It may be appreciated that in accordance with an embodiment the processing of the usage data by the multi-tiered reporting service preferably anonymizes the usage data with the removal or conversion of the identification data therefrom. That is, the resultant second set of data has no information that relates the usage of the cloud products or services to any particular end user or customer.

In accordance with an example embodiment, the generating the second set of data may include replacing references in the usage data to the user entities with references to the first entity.

In accordance with an example embodiment, the generating the second set of data may include reformatting the usage data that records the usage by the user entities of the plurality of services to conform with a record of usage by the second entity of the plurality of services.

The second set of data is provided at 512 by the multi-tiered reporting service to a second entity associated with control of the cloud environment. In accordance with an example embodiment, the second entity may be the cloud infrastructure provider.

Figure 13:
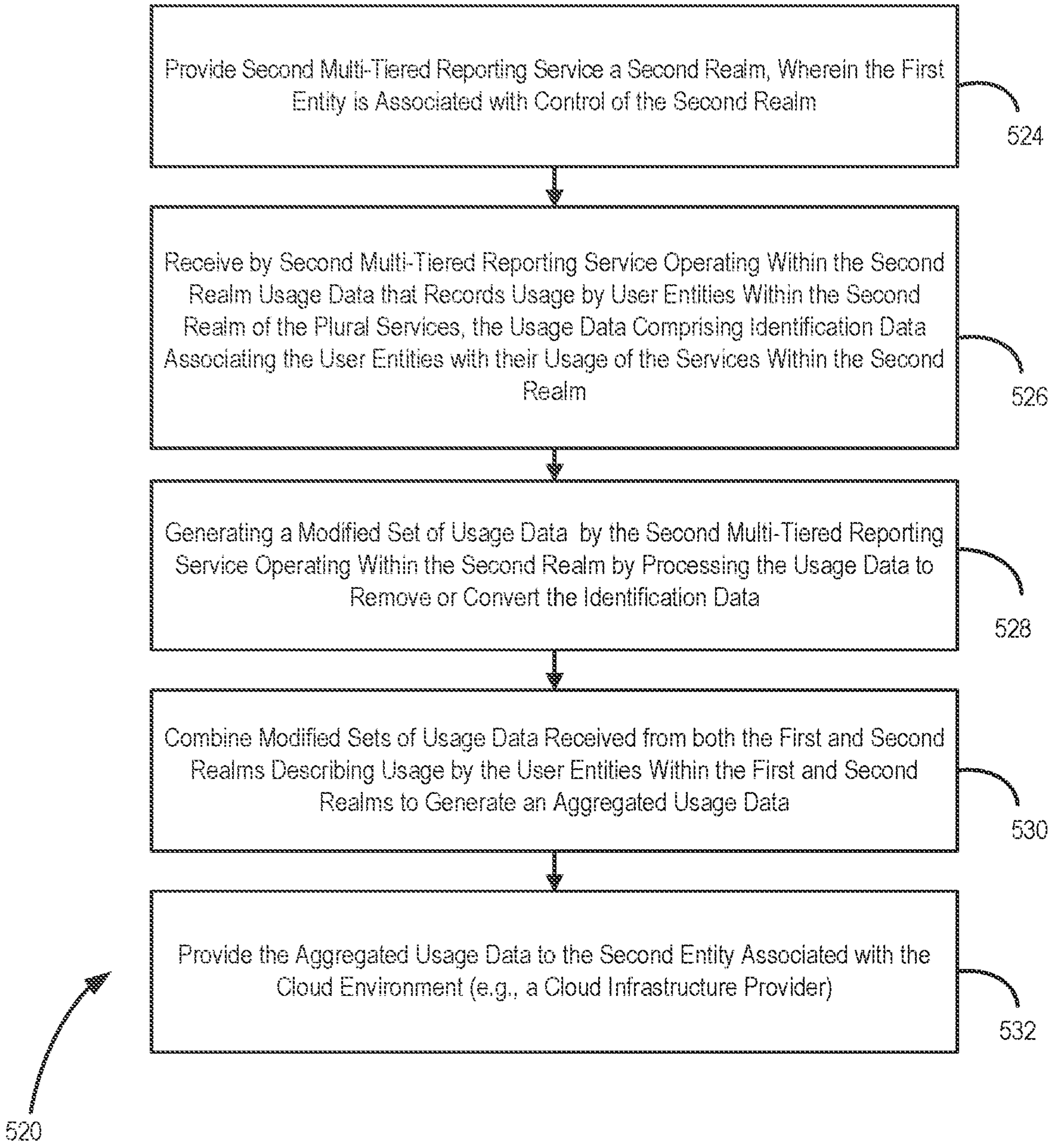
FIG. 13 is a further flow diagram illustrating a method for providing a tiered assessment of use of software products or services in a cloud computing or other computing environment, in accordance with an embodiment.

FIG. 13 is a further flow diagram illustrating a method 520 for providing a tiered assessment of use of software products or services in a cloud computing or other computing environment, in accordance with an embodiment.

As illustrated in FIG. 13, in accordance with an embodiment, at 524 a second multi-tiered reporting service is provided a second Realm B such as shown for example in FIG. 9. In the example embodiment the second multi-tiered reporting service is operable to monitor usage of the services within the second realm, wherein the first entity is associated with control of the second realm. In the example embodiment the second entity associated with control of the second realm may be, for example, a PLC operator.

In accordance with an embodiment, customer usage data is received at 526 by the second multi-tiered reporting service operating within the second Realm B. It may be appreciated that in accordance with an embodiment the usage data records usage, by user entities within the second Realm B, of the plurality of services, wherein the usage data comprises identification data associating the user entities with their usage of the services within the second realm. The user entities may be end user customers of the PLC operator, for example.

The customer usage data received by the second multi-tiered reporting service at 526 may be provided to the PCL operator for reporting and confirming the use of the cloud services and products by the end user customers.

A modified set of usage data is generated at 528 by the second multi-tiered reporting service operating within the second Realm B. In the example embodiment, the modified set of usage data is generated by the second multi-tiered reporting service by processing the usage data to remove or convert the identification data.

Aggregated usage data is generated at 530 by combining modified sets of usage data received from both the first and second realms, wherein the aggregated usage data describes usage by the user entities within the first and second realms.

The aggregated usage data is provided at 532 to the second entity cloud infrastructure operator associated with the cloud environment.

In addition, one or more rules or policies may be communicated from the second entity associated with control of the cloud environment to the first entity associated with control of the first realm, wherein the one or more rules or policies may be stored within the first realm and modify an operation of the multi-tiered reporting service in monitoring the usage of the services within the first realm.

It may be appreciated that in accordance with an embodiment the first entity may be a realm operator, and the second entity may be a cloud infrastructure provider.

Figure 14:
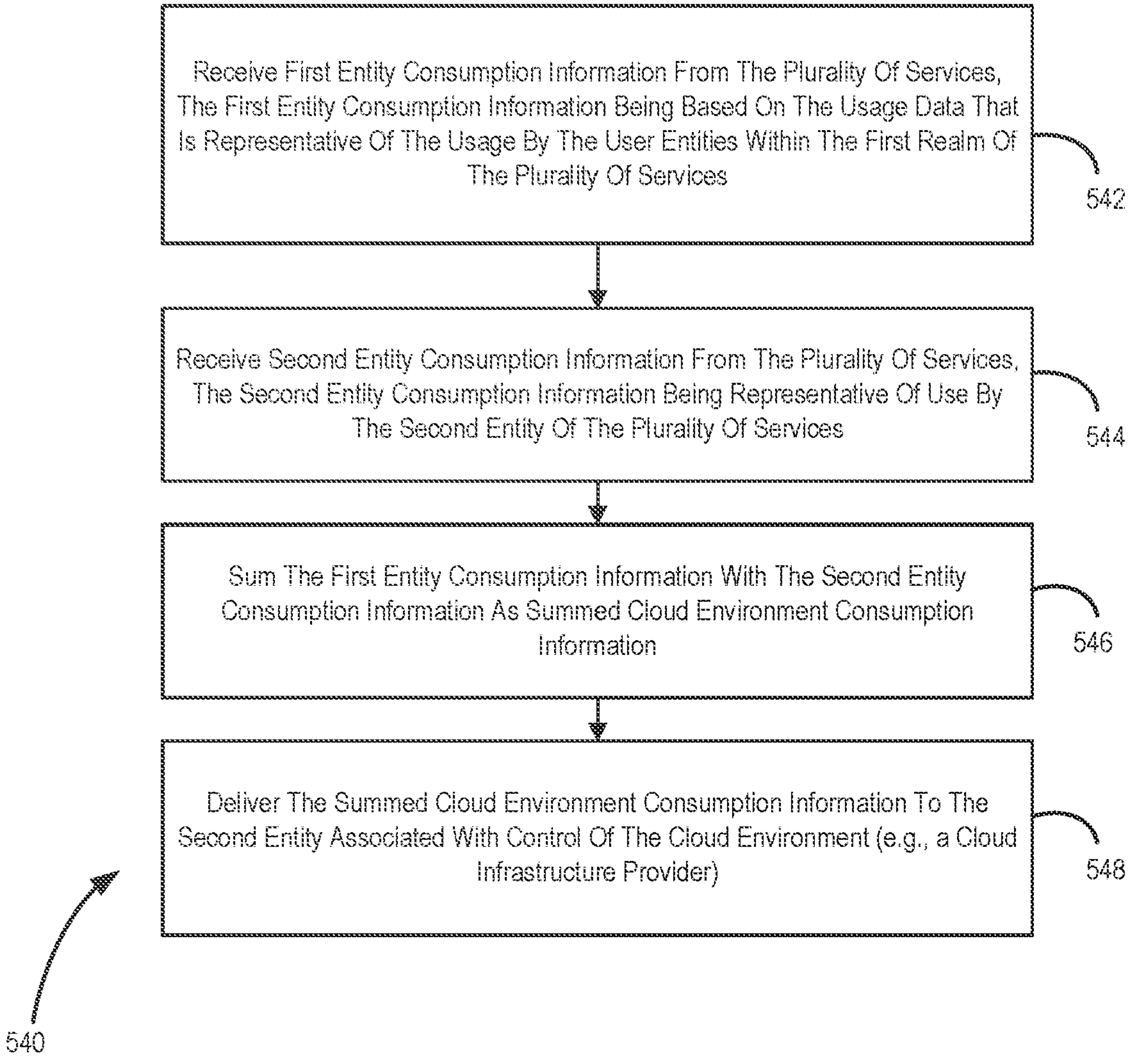
FIG. 14 is a further flow diagram illustrating a method for providing a tiered assessment of use of software products or services in a cloud computing or other computing environment, in accordance with an embodiment.

FIG. 14 is a further flow diagram illustrating a method 540 for providing a tiered assessment of use of software products or services in a cloud computing or other computing environment, in accordance with an embodiment.

As illustrated in FIG. 14, in accordance with an embodiment, the multi-tiered reporting service is configured to receive at 542 first entity consumption information from the plurality of services, wherein the first entity consumption information is based on the usage data that is representative of the usage by the user entities within the first realm of the plurality of services.

The multi-tiered reporting service is further configured to receive at 544 second entity consumption information from the plurality of services, wherein the second entity consumption information is representative of use by the second entity of the plurality of services.

The multi-tiered reporting service sums at 546 the first entity consumption information with the second entity consumption information as summed cloud environment consumption information.

The multi-tiered reporting service delivers at 548 the summed cloud environment consumption information to the second entity associated with control of the cloud environment.

Figure 15:
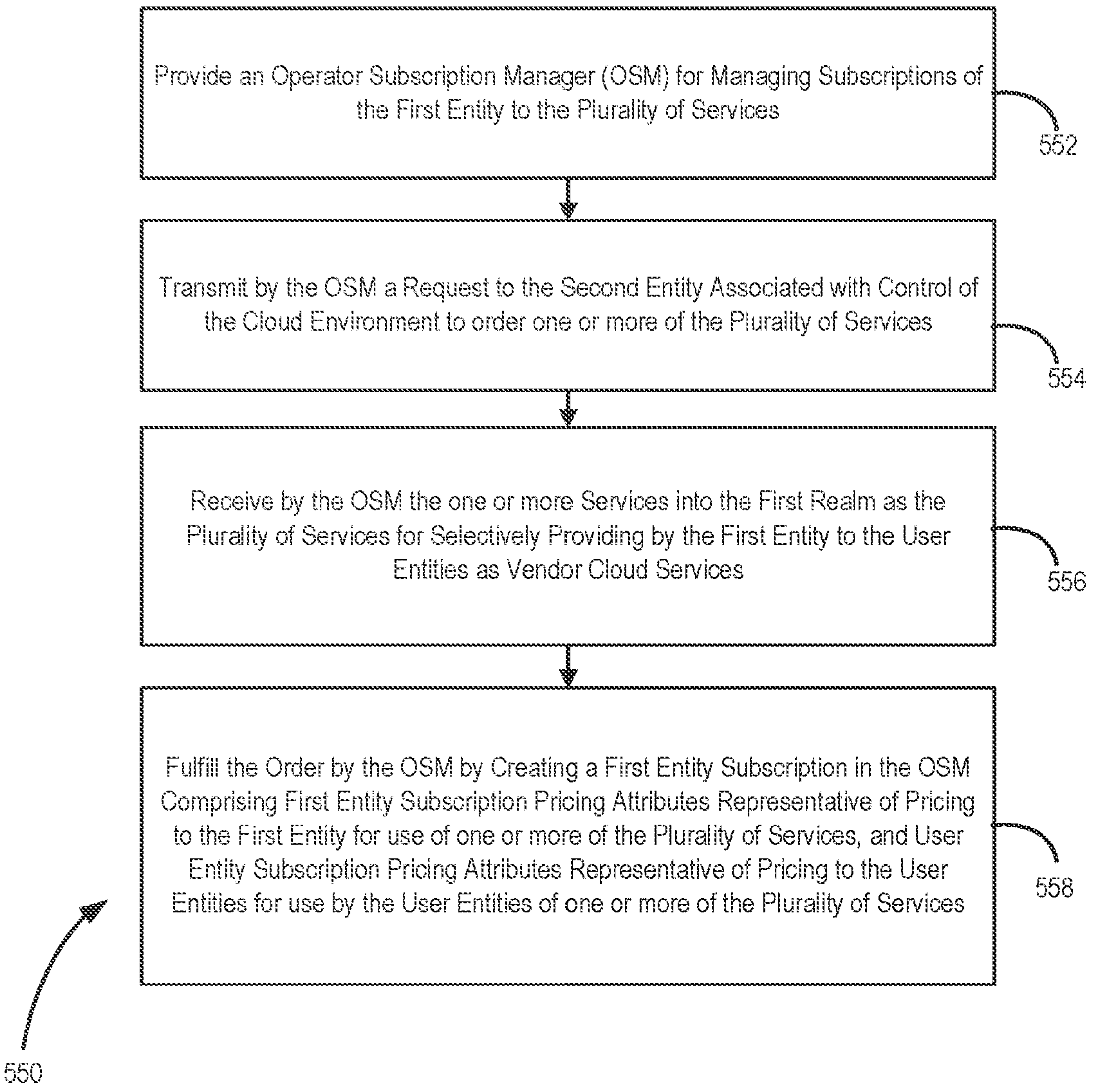
FIG. 15 is a further flow diagram illustrating a method for providing a tiered assessment of use of software products or services in a cloud computing or other computing environment, in accordance with an embodiment.

FIG. 15 is a further flow diagram illustrating a method 550 for providing a tiered assessment of use of software products or services in a cloud computing or other computing environment, in accordance with an embodiment.

As illustrated in FIG. 15, in accordance with an embodiment, an operator subscription manager (OSM) is provided at 552 for managing subscriptions of the first entity to the plurality of services.

The OSM is configured to transmit at 554 a request to the second entity associated with control of the cloud environment to order one or more of the plurality of services.

The OSM is further configured to receive at 556 the one or more services into the first realm as the plurality of services for selectively providing by the first entity to the user entities as vendor cloud services.

In accordance with a further example embodiment, the OSM is configured to fulfill the order at 558 by creating a first entity subscription in the OSM, the first entity subscription comprising first entity subscription pricing attributes representative of pricing to the first entity for use of one or more of the plurality of services, and user entity subscription pricing attributes representative of pricing to the user entities for use by the user entities of one or more of the plurality of services.

Figure 16:
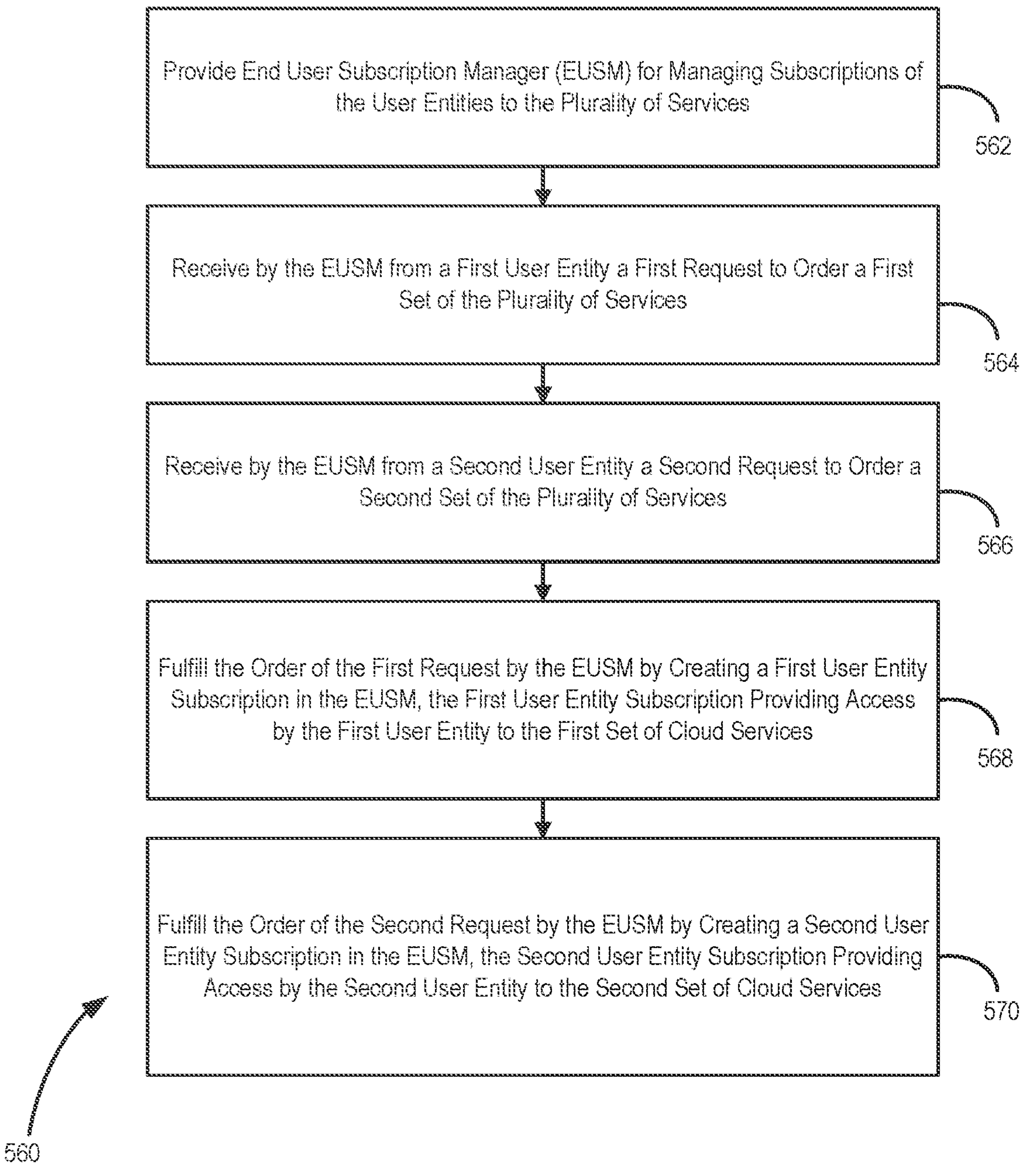
FIG. 16 is a further flow diagram illustrating a method for providing a tiered assessment of use of software products or services in a cloud computing or other computing environment, in accordance with an embodiment.

FIG. 16 is a further flow diagram illustrating a method 560 for providing a tiered assessment of use of software products or services in a cloud computing or other computing environment, in accordance with an embodiment.

As illustrated in FIG. 16, in accordance with an embodiment, an end user subscription manager (EUSM) is provided at 562 for managing subscriptions of the user entities to the plurality of services.

The EUSM is operable to receive at 564 from a first user entity a first request to order a first set of the plurality of services.

The EUSM is further operable to receive at 566 from a second user entity a second request to order a second set of the plurality of services.

The EUSM is further operable to fulfill the order of the first request at 568 by creating a first user entity subscription in the EUSM, wherein the first user entity subscription provides access by the first user entity to the first set of cloud services.

The EUSM is further operable to fulfill the order of the second request at 570 by creating a second user entity subscription in the EUSM, wherein the second user entity subscription provides access by the second user entity to the second set of cloud services.

In accordance with various embodiments, the teachings herein can be implemented using one or more computer, computing device, machine, or microprocessor, including one or more processors, memory and/or computer readable storage media programmed according to the teachings herein. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMS, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Further modifications and variations will be apparent to the practitioner skilled in the art.

The embodiments were chosen and described in order to best explain the principles of the teachings herein and their practical application, thereby enabling others skilled in the art to understand the various embodiments and with various modifications that are suited to the particular use contemplated. It is intended that the scope be defined by the following claims and their equivalents.

What is claimed is:

1. One or more non-transitory computer readable media comprising instructions which, when executed by one or more hardware processors, cause performance of operations for implementing a cloud environment, comprising:

implementing a first set of one or more tenancies, wherein subscriptions of the first set of tenancies are provider-provider subscriptions between a cloud provider and the cloud provider itself;

implementing a second set of one or more tenancies, wherein subscriptions of the second set of tenancies are reseller-provider subscriptions between a cloud reseller and the cloud provider; and implementing a third set of one or more tenancies, wherein subscriptions of the third set of tenancies are customer-reseller subscriptions between a respective end customer and the cloud reseller;

determining parties to subscriptions based at least in part on one or more stored values associated with one or more subscription metadata fields within an accounts service, the one or more stored values identifying whether a subscription relationship associated with a particular tenancy is a provider-provider subscription, a reseller-provider subscription, or a customer-reseller subscription; and enforcing permissions to resources within the first set of tenancies, the second set of tenancies, or the third set of tenancies based at least in part on the one or more stored values.

2. The non-transitory computer readable media of claim 1, wherein the operations further comprise:

implementing a fourth set of one or more tenancies, wherein subscriptions of the fourth set of tenancies are reseller-reseller subscriptions between a cloud reseller and the cloud reseller itself.

3. The non-transitory computer readable media of claim 1, wherein the subscription between the cloud reseller and the cloud provider indicates that resource usage associated with the second set of tenancies is billed from the cloud provider to the cloud reseller.

4. The non-transitory computer readable media of claim 1, wherein the operations further comprise:

receiving, at a subscription service associated with the cloud provider, a request to create a tenancy associated with a particular end customer;

creating a particular tenancy associated with the particular end customer; and storing subscription metadata that indicates a subscription relationship between the cloud reseller and the particular end customer.

5. The non-transitory computer readable media of claim 1, wherein the operations further comprise:

executing a tenancy creation workflow to create a tenancy of the second set of tenancies as part of a region build process; and creating a subscription associated with the tenancy.

6. The non-transitory computer readable media of claim 1, wherein creating the subscription comprises:

storing subscription metadata that indicates a subscription relationship between the cloud reseller and the cloud provider; and storing billing metadata that references pricing information associated with the subscription.

7. The non-transitory computer readable media of claim 6, wherein the subscription is associated with one or more of:

a) a product;
b) commits;
c) billing model; and
d) subscription state.

8. The non-transitory computer readable media of claim 1, wherein the operations further comprise:

receiving, at a billing service, usage information and cost information; and based at least in part on the usage information and the cost information, calculating charges associated with the subscription for a period of time associated with the usage information.

9. The non-transitory computer readable media of claim 8, wherein the cost information identifies resource-dependent fees associated with the particular subscription.

10. The non-transitory computer readable media of claim 9, wherein the billing service is associated with the cloud provider and the cost information is received from a subscription pricing service associated with the cloud provider, and the operations further comprise:

prior to receiving the cost information at the billing service, providing the cost information to the subscription pricing service by a user or service associated with the cloud reseller.

11. The non-transitory computer readable media of claim 10, wherein the cost information is accessible to the billing service and the subscription pricing service, wherein the cost information is inaccessible to users associated with the cloud provider.

12. The non-transitory computer readable media of claim 8, wherein the usage information comprises resource usage metrics related to a particular subscription.

13. The non-transitory computer readable media of claim 1, wherein the operations further comprise:

receiving, at a subscription pricing service controlled by the cloud provider, a request to manage reseller pricing information associated with services offered by reseller to end customers;

wherein users associated with the cloud provider are unable to access the reseller pricing information, and users associated with the cloud reseller can access the reseller pricing information; and creating, for a tenancy of the third set of tenancies, a subscription between the cloud reseller and a particular end customer, wherein the subscription is associated with the reseller pricing information.

14. The non-transitory computer readable media of claim 13, wherein the operations further comprise:

storing a set of one or more pricing rules associated with the reseller pricing information, wherein the pricing rules comprise:

a mapping between one or more products and one or more eligibility criteria; and one or more pricing adjustment identifiers that identify one or more pricing adjustments to be applied to a subscription if the one or more eligibility criteria are met; and monitoring events to determine whether the one or more eligibility criteria have been met.

15. The non-transitory computer-readable media of claim 14, wherein the one or more pricing adjustments are associated with one or more of the following product attributes:

a) discount group;

b) product category; and c) product identifier.

16. The non-transitory computer-readable media of claim 14, wherein the operations further comprise:

determining that the one or more eligibility criteria have been met for a pricing adjustment to be applied to the tenancy; and applying the pricing adjustment to the subscription between the cloud reseller and the end customer for the tenancy.

17. A system comprising:

at least one device including a hardware processor;

the system being configured to perform operations comprising:

implementing a first set of one or more tenancies, wherein subscriptions of the first set of tenancies are provider-provider subscriptions between a cloud provider and the cloud provider itself;

implementing a second set of one or more tenancies, wherein subscriptions of the second set of tenancies are reseller-provider subscriptions between a cloud reseller and the cloud provider; and implementing a third set of one or more tenancies, wherein subscriptions of the third set of tenancies are customer-reseller subscriptions between a respective end customer and the cloud reseller;

determining parties to subscriptions based at least in part on one or more stored values associated with one or more subscription metadata fields within an accounts service, the one or more stored values identifying whether a subscription relationship associated with a particular tenancy is a provider-provider subscription, a reseller-provider subscription, or a customer-reseller subscription; and enforcing permissions to resources within the first set of tenancies, the second set of tenancies, or the third set of tenancies based at least in part on the one or more stored values.

18. A method for implementing a cloud environment, the method comprising:

implementing a first set of one or more tenancies, wherein subscriptions of the first set of tenancies are provider-provider subscriptions between a cloud provider and the cloud provider itself;

implementing a second set of one or more tenancies, wherein subscriptions of the second set of tenancies are reseller-provider subscriptions between a cloud reseller and the cloud provider; and implementing a third set of one or more tenancies, wherein subscriptions of the third set of tenancies are customer-reseller subscriptions between a respective end customer and the cloud reseller;

determining parties to subscriptions based at least in part on one or more stored values associated with one or more subscription metadata fields within an accounts service, the one or more stored values identifying whether a subscription relationship associated with a particular tenancy is a provider-provider subscription, a reseller-provider subscription, or a customer-reseller subscription; and enforcing permissions to resources within the first set of tenancies, the second set of tenancies, or the third set of tenancies based at least in part on the one or more stored values; and wherein the method is performed by at least one device including a hardware processor.

19. The method of claim 18, further comprising:

receiving, at a subscription service associated with the cloud provider, a request to create a tenancy associated with a particular end customer;

creating a particular tenancy associated with the particular end customer; and storing subscription metadata that indicates a subscription relationship between the cloud reseller and the particular end customer.

20. The method of claim 18, further comprising:

storing a set of one or more pricing rules associated with reseller pricing information, wherein the pricing rules comprise:

a mapping between one or more products and one or more eligibility criteria; and one or more pricing adjustment identifiers that identify one or more pricing adjustments to be applied to a subscription if the one or more eligibility criteria are met; and monitoring events to determine whether the one or more eligibility criteria have been met.

* * * * *